US010598892B2

(12) United States Patent
Tanaka

(10) Patent No.: US 10,598,892 B2
(45) Date of Patent: Mar. 24, 2020

(54) FOCUSING CONTROL DEVICE, IMAGING DEVICE, FOCUSING CONTROL METHOD, AND FOCUSING CONTROL PROGRAM

(71) Applicant: FUJIFILM Corporation, Tokyo (JP)

(72) Inventor: Koichi Tanaka, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/939,776

(22) Filed: Mar. 29, 2018

(65) Prior Publication Data

US 2018/0217358 A1 Aug. 2, 2018

Related U.S. Application Data

(63) Continuation of application No. PCT/JP2016/066299, filed on Jun. 1, 2016.

(30) Foreign Application Priority Data

Sep. 30, 2015 (JP) .................................. 2015-194232

(51) Int. Cl.
*H04N 5/232* (2006.01)
*G03B 13/00* (2006.01)
(Continued)

(52) U.S. Cl.
CPC ................. *G02B 7/36* (2013.01); *G06F 3/00* (2013.01); *H04N 5/23212* (2013.01);
(Continued)

(58) Field of Classification Search
CPC ........ G03B 13/00; G03B 13/36; H04N 5/232; H04N 5/232123; H04N 5/23212; H04N 5/23216; G02B 7/36; G06F 3/00
(Continued)

(56) References Cited

U.S. PATENT DOCUMENTS

| 6,275,262 B1 * | 8/2001 | Ito ....................... H04N 5/23212 348/345 |
| 8,537,264 B2 * | 9/2013 | Ono .................... H04N 5/23212 348/335 |
| 9,641,741 B2 * | 5/2017 | Watanabe .......... H04N 5/23219 |

FOREIGN PATENT DOCUMENTS

| JP | 2004-325517 A | 11/2004 |
| JP | 2013-160925 A | 8/2013 |
| JP | 2015-43042 A | 3/2015 |

OTHER PUBLICATIONS

International Preliminary Report on Patentability and Written Opinion of the International Searching Authority (forms PCT/IPEA/409 and PCT/Isa/237), dated Feb. 27, 2017, for International Application No. PCT/JP2016/066299, with an English International Preliminary Report on Patentability.

(Continued)

*Primary Examiner* — Trang U Tran
(74) *Attorney, Agent, or Firm* — Birch, Stewart, Kolasch & Birch, LLP

(57) ABSTRACT

A focusing control device includes: an evaluation value calculation unit that causes an imaging element which images a subject through a focus lens to image the subject for each of positions of the focus lens while moving the focus lens movable in an optical axis direction, and calculates evaluation values for determining a focusing position of the focus lens based on signals acquired by performing any filtering process selected among a plurality of filtering processes in which passbands are different on captured image signals acquired through the imaging; a focusing position determination unit as defined herein; and a focusing control unit that performs focusing control to move the focus lens to the focusing position, and the focusing position determination unit increases number of the selected evaluation values as a lower frequency limit of the passband (Continued)

becomes lower, as the filtering process selected by the evaluation value calculation unit.

16 Claims, 13 Drawing Sheets

(51) Int. Cl.
*G02B 7/36* (2006.01)
*G06F 3/00* (2006.01)
*G03B 13/36* (2006.01)

(52) U.S. Cl.
CPC ... *H04N 5/23216* (2013.01); *H04N 5/232123* (2018.08); *G03B 13/36* (2013.01)

(58) Field of Classification Search
USPC .................................. 348/345, 349, 335, 353
See application file for complete search history.

(56) References Cited

OTHER PUBLICATIONS

International Search Report (form PCT/ISA/210), dated Aug. 23, 2016, for International Application No. PCT/JP2016/066299, with an English translation.
Chinese Office Action and Search Report dated Nov. 28, 2019, for Chinese Application No. 201680058115.3. along with an English transtation of the Chinese Office Action and Search Report.

* cited by examiner

FOCUSING CONTROL DEVICE, IMAGING DEVICE, FOCUSING CONTROL METHOD, AND FOCUSING CONTROL PROGRAM

CROSS REFERENCE TO RELATED APPLICATION

This is a continuation of International Application No. PCT/JP2016/066299 filed on Jun. 1, 2016, and claims priority from Japanese Patent Application No. 2015-194232 filed on Sep. 30, 2015, the entire disclosures of which are incorporated herein by reference.

BACKGROUND OF THE INVENTION

1. Field of the Invention

The present invention relates to a focusing control device, an imaging device, a focusing control method, and a computer readable medium storing a focusing control program.

2. Description of the Related Art

In recent years, with an increase in resolution of imaging elements, such as a charge coupled device (CCD) image sensor and a complementary metal oxide semiconductor (CMOS) image sensor, there is a rapid increase in demand for information devices having an imaging function, such as a digital still camera, a digital video camera, and a smartphone. The information devices having an imaging function described above are referred to as imaging devices.

In these imaging devices, as a focusing control method which focuses on a main subject, a contrast auto focus (AF) method or a phase difference AF method is employed.

The contrast AF method is a method which acquires contrast of captured image signals obtained in movement stages while moving a focus lens in an optical axis direction as evaluation values and determines a lens position having the highest evaluation value as a focusing position.

JP2015-43042A and JP2013-160925A disclose an imaging device that performs focusing control through the contrast AF method. JP2015-43042A describes a method of acquiring a polynomial approximate curve expressed by two polynomial approximate expressions by a plurality of evaluation values acquired through the above-described method and determining an intersection position of the two polynomial approximate curves as a focusing position.

SUMMARY OF THE INVENTION

In order to accurately determine a focusing position, the acquisition of the evaluation values in minute steps by minutely moving the focus lens is effective. However, the number of lens positions in which the evaluation values are acquired increases, and thus, a calculation amount increases. As described in JP2015-43042A, an approximate curve of an evaluation value curve indicating a relationship between the positions of the focus lens and the evaluation values is acquired from a plurality of discretely acquired evaluation values, and the lens position in which the evaluation value becomes maximum is estimated.

A shape of the evaluation value curve is steep in a case where the contrast of the subject desired to focus on is high, but the shape of the evaluation value curve is gentle in a case where the contrast of the subject desired to focus on is low. In a case where the shape of the evaluation value curve is gentle, since calculation accuracy of the approximate curve of the evaluation value curve deteriorates, there is a high possibility that the focusing position will be incorrectly determined. That is, it is important to increase the calculation accuracy of the approximate curve estimated from the plurality of evaluation values in order to increase focusing accuracy.

The imaging device described in JP2015-43042A approximates the evaluation value curve by using the polynomial approximate curve. However, since the calculation accuracy of the polynomial approximate curve deteriorates as stated above in a case where a subject having low contrast is captured, the focusing accuracy deteriorates.

JP2013-160925A does not describe a specific method of estimating the focusing position from the plurality of evaluation values.

The invention has been made in view of such circumstances, and an object of the invention is to provide a focusing control device, an imaging device, a focusing control method, and a computer readable medium storing a focusing control program capable of focusing on even a subject having low frequency or low contrast with high accuracy.

A focusing control device according to a first aspect of the invention comprises an evaluation value calculation unit that causes an imaging element which images a subject through a focus lens to image the subject for each of positions of the focus lens while moving the focus lens movable in an optical axis direction, and calculates evaluation values for determining a focusing position of the focus lens based on signals acquired by performing any filtering process selected among a plurality of filtering processes in which passbands are different on captured image signals acquired through the imaging, a focusing position determination unit that selects a plurality of evaluation values among the evaluation values calculated by the evaluation value calculation unit, calculates a maximum point of an evaluation value curve indicating a relationship between the evaluation values and the positions of the focus lens based on the plurality of selected evaluation values, and determines the position of the focus lens corresponding to the maximum point, as the focusing position, and a focusing control unit that performs focusing control for moving the focus lens to the focusing position. The focusing position determination unit increases the number of evaluation values to be selected as a lower frequency limit of the passband becomes lower, as the filtering process selected by the evaluation value calculation unit.

A focusing control device according to a second aspect of the invention comprises an evaluation value calculation unit that causes an imaging element which images a subject through a focus lens to image the subject for each of positions of the focus lens while moving the focus lens movable in an optical axis direction, and calculates evaluation values for determining a focusing position of the focus lens based on captured image signals acquired through the imaging, a focusing position determination unit that selects a plurality of evaluation values among the evaluation values calculated by the evaluation value calculation unit, calculates a maximum point of an evaluation value curve indicating a relationship between the evaluation values and the positions of the focus lens based on the plurality of selected evaluation values, and determines the position of the focus lens corresponding to the maximum point, as the focusing position, a focusing control unit that performs focusing control for moving the focus lens to the focusing position, and a sharpness determination unit that determines sharpness of a curve indicating a relationship between the evaluation values and a predetermined movement range of the focus lens based on the evaluation values corresponding to the movement range including the position of the focus lens at which a maximum evaluation value among the evaluation values calculated by the evaluation value calculation unit is acquired. The focusing position determination unit increases the number of evaluation values to be selected as the sharpness determined by the sharpness determination unit becomes lower.

An imaging device according to the invention comprises the focusing control device a, and an imaging element that images a subject through a focus lens moved to a focusing position by the focusing control unit.

A focusing control method according to a first aspect of the invention comprises an evaluation value calculation step of causing an imaging element which images a subject through a focus lens to image the subject for each of positions of the focus lens while moving the focus lens movable in an optical axis direction, and calculating evaluation values for determining a focusing position of the focus lens based on captured image signals acquired through the imaging, a focusing position determination step of selecting a plurality of evaluation values among the evaluation values calculated in the evaluation value calculation step, calculating a maximum point of an evaluation value curve indicating a relationship between the evaluation values and the positions of the focus lens based on the plurality of selected evaluation values, and determining the position of the focus lens corresponding to the maximum point, as the focusing position, and a focusing control step of performing focusing control for moving the focus lens to the focusing position. In the evaluation value calculation step, the evaluation values are calculated based on signals acquired by performing any filtering process selected among a plurality of filtering processes in which passbands are different on the captured image signals, and in the focusing position determination step, the number of evaluation values to be selected increases as a lower frequency limit of the passband becomes lower, as the filtering process selected in the evaluation value calculation step.

A focusing control method according to a second aspect of the invention comprises an evaluation value calculation step of causing an imaging element which images a subject through a focus lens to image the subject for each of positions of the focus lens while moving the focus lens movable in an optical axis direction, and calculating evaluation values for determining a focusing position of the focus lens based on captured image signals acquired through the imaging, a focusing position determination step of selecting a plurality of evaluation values among the evaluation values calculated in the evaluation value calculation step, calculating a maximum point of an evaluation value curve indicating a relationship between the evaluation values and the positions of the focus lens based on the plurality of selected evaluation values, and determining the position of the focus lens corresponding to the maximum point, as the focusing position, a focusing control step of performing focusing control for moving the focus lens to the focusing position, and a sharpness determination step of determining sharpness of a curve indicating a relationship between the evaluation values and a predetermined movement range of the focus lens based on the evaluation values corresponding to the movement range including the position of the focus lens in which the maximum evaluation value among the evaluation values calculated in the evaluation value calculation step is acquired. In the focusing position determination step, the number of evaluation values to be selected increases as the sharpness determined in the sharpness determination step becomes lower.

A focusing control program according to a first aspect of the invention causes a computer to perform an evaluation value calculation step of causing an imaging element which images a subject through a focus lens to image the subject for each of positions of the focus lens while moving the focus lens movable in an optical axis direction, and calculating evaluation values for determining a focusing position of the focus lens based on captured image signals acquired through the imaging, a focusing position determination step of selecting a plurality of evaluation values among the evaluation values calculated in the evaluation value calculation step, calculating a maximum point of an evaluation value curve indicating a relationship between the evaluation values and the positions of the focus lens based on the plurality of selected evaluation values, and determining the position of the focus lens corresponding to the maximum point, as the focusing position, and a focusing control step of performing focusing control for moving the focus lens to the focusing position. In the evaluation value calculation step, the evaluation values are calculated based on signals acquired by performing any filtering process selected among a plurality of filtering processes in which passbands are different on the captured image signals, and in the focusing position determination step, the number of evaluation values to be selected increases as a lower frequency limit of the passband becomes lower, as the filtering process selected in the evaluation value calculation step.

A focusing control program according to a second aspect of the invention causes a computer to perform an evaluation value calculation step of causing an imaging element which images a subject through a focus lens to image the subject for each of positions of the focus lens while moving the focus lens movable in an optical axis direction, and calculating evaluation values for determining a focusing position of the focus lens based on captured image signals acquired through the imaging, a focusing position determination step of selecting a plurality of evaluation values among the evaluation values calculated in the evaluation value calculation step, calculating a maximum point of an evaluation value curve indicating a relationship between the evaluation values and the positions of the focus lens based on the plurality of selected evaluation values, and determining the position of the focus lens corresponding to the maximum point, as the focusing position, a focusing control step of performing focusing control for moving the focus lens to the focusing position, and a sharpness determination step of determining sharpness of a curve indicating a relationship between the evaluation values and a predetermined movement range of the focus lens based on the evaluation values corresponding to the movement range including the position of the focus lens in which the maximum evaluation value among the evaluation values calculated in the evaluation value calculation step is acquired. In the focusing position determination step, the number of evaluation values to be selected increases as the sharpness determined in the sharpness determination step becomes lower.

According to the invention, it is possible to provide a focusing control device, an imaging device, a focusing control method, and a focusing control program capable of focusing on even a subject having low frequency or low contrast with high accuracy.

DESCRIPTION OF THE PREFERRED EMBODIMENTS

Figure 1:
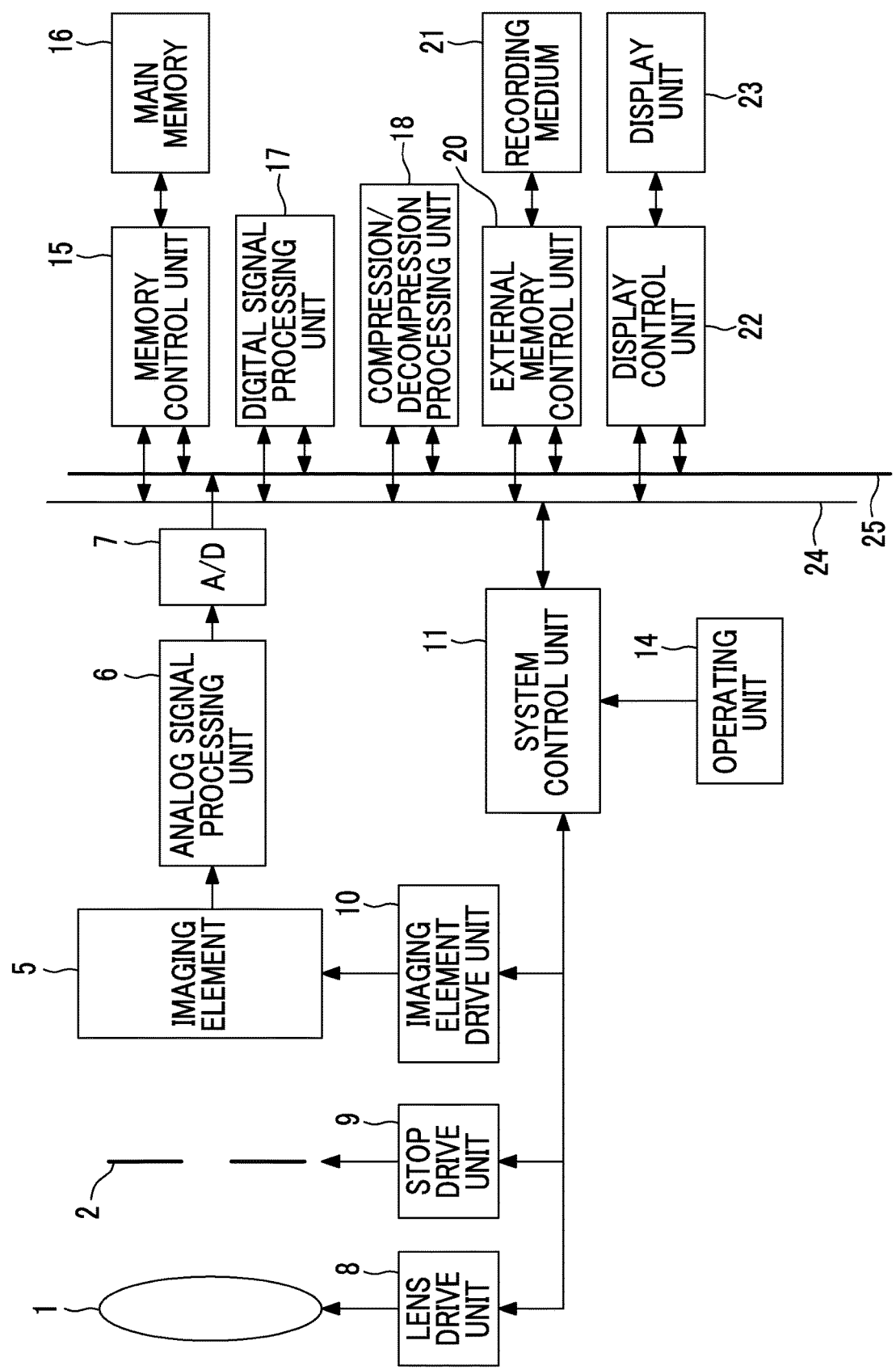
FIG. 1 is a diagram showing the schematic configuration of a digital camera as an example of an imaging device for describing an embodiment of the invention.

Hereinafter, an embodiment of the invention will be described by referring to the drawings.

FIG. 1 is a diagram showing the schematic configuration of a digital camera as an example of an imaging device for describing an embodiment of the invention.

An imaging system of the digital camera shown in FIG. 1 includes an imaging optical system (including an imaging lens 1 and a stop 2), and an imaging element 5 which images a subject through the imaging optical system, such as a CCD type or a CMOS type. The imaging optical system including the imaging lens 1 and the stop 2 is detachably attached in or fixed into a camera body. The imaging lens 1 includes a focus lens which is movable in an optical axis direction.

The focus lens is a lens that adjusts a focusing position of the imaging optical system by moving in the optical axis direction. The imaging lens 1 consists of a plurality of lens groups, and all the groups are focus lenses in a case where an all-group moving type lens is used.

A system control unit 11 that generally controls the entire electric control system of the digital camera controls a lens drive unit 8 to move the focus lens included in the imaging lens 1. The system control unit 11 adjusts the amount of exposure by controlling the amount of aperture of the stop 2 through a stop drive unit 9.

The system control unit 11 drives the imaging element 5 through an imaging element drive unit 10, and outputs a subject image captured through the imaging lens 1, as captured image signals. A command signal from a user is input to the system control unit 11 through an operating unit 14.

The electric control system of the digital camera further includes an analog signal processing unit 6 which is connected to an output of the imaging element 5 and performs analog signal processing, such as correlative double sampling processing, and an analog-to-digital conversion circuit (A/D) 7 which converts an analog signal output from the analog signal processing unit 6 into a digital signal. The analog signal processing unit 6 and the analog-to-digital conversion circuit 7 are controlled by the system control unit 11. The analog signal processing unit 6 and the analog-to-digital conversion circuit 7 may be built in the imaging element 5.

The electric control system of the digital camera further includes a main memory 16, a memory control unit 15 which is connected to the main memory 16, a digital signal processing unit 17 which generates captured image data by performing interpolation calculation, gamma correction calculation, and the like on the captured image signals output from the analog-to-digital conversion circuit 7, a compression/decompression processing unit 18 which compresses the captured image data generated by the digital signal processing unit 17 in a Joint Photographic Experts Group (JPEG) format or decompresses the compressed image data, an external memory control unit 20 to which a detachable recording medium 21 is connected, and a display control unit 22 to which a display unit 23 mounted on a camera rear surface or the like is connected.

The memory control unit 15, the digital signal processing unit 17, the compression/decompression processing unit 18, the external memory control unit 20, and the display control unit 22 are connected to one another by a control bus 24 and a data bus 25, and are controlled according to commands from the system control unit 11.

Figure 2:
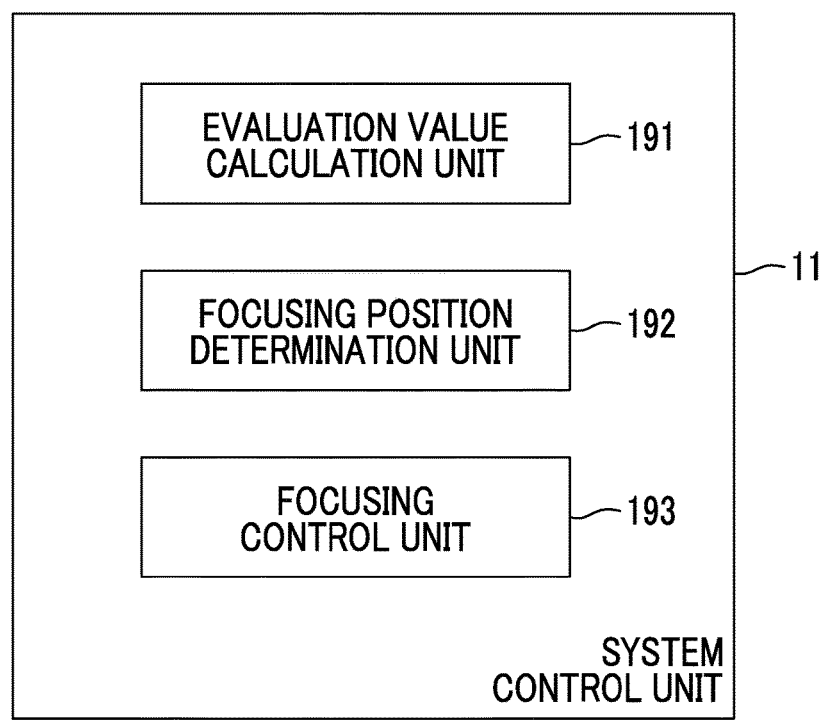
FIG. 2 is a functional block diagram of a system control unit 11 of the digital camera shown in FIG. 1.

FIG. 2 is a functional block diagram of the system control unit 11 in the digital camera shown in FIG. 1.

The system control unit 11 includes an evaluation value calculation unit 191, a focusing position determination unit 192, and a focusing control unit 193. These functional blocks are formed by a focusing control program being executed by a processor included in the system control unit 11. The system control unit 11 constitutes a focusing control device.

The evaluation value calculation unit 191 causes the imaging element 5 to image the subject for movement positions (three or more positions) of the focus lens while moving the focus lens included in the imaging lens 1 by controlling the lens drive unit 8.

The evaluation value calculation unit 191 calculates evaluation values (hereinafter, referred to as AF evaluation values) for determining the focusing position of the focus lens based on signals acquired by performing any filtering process selected from a plurality of filtering processes in which passbands are different on the captured image signals acquired through the imaging.

The AF evaluation values are acquired by calculating contrast values of captured image signals acquired by performing the filtering process. The plurality of filtering processes are high-pass filtering processes in which cut-off frequencies are different or band-pass filtering processes in which center frequencies are different.

The focusing position determination unit 192 selects a plurality of AF evaluation values from three or more AF evaluation values calculated based on the captured image signals acquired by performing an arbitrary filtering process performed by the evaluation value calculation unit 191.

The focusing position determination unit 192 calculates a maximum point of an evaluation value curve (hereinafter, referred to as an AF evaluation value curve) indicating the relationship between focus lens positions and AF evaluation values for the subject on which the imaging is being performed based on the selected AF evaluation values, and determines the position of the focus lens corresponding to the calculated maximum point, as the focusing position.

The focusing position determination unit 192 determines a filtering process used for the acquisition of the three or more AF evaluation values calculated by the evaluation value calculation unit 191, and determines the number of AF evaluation values used in the calculation of the AF evaluation value curve depending on a lower frequency limit of the passband in the determined filtering process.

The focusing position determination unit 192 selects the AF evaluation value as a maximum value, the AF evaluation value corresponding to at least one position of the focus lens positions corresponding to these AF evaluation values on one side in a movement direction of the focus lens, and the AF evaluation value corresponding to at least one position of the focus lens positions corresponding to these AF evaluation values on the other side in the movement direction of the focus lens, from the three or more AF evaluation values calculated by the evaluation value calculation unit 191.

The focusing control unit 193 performs focusing control for moving the focus lens on the focusing position determined by the focusing position determination unit 192 by controlling the lens drive unit 8.

Figure 3:
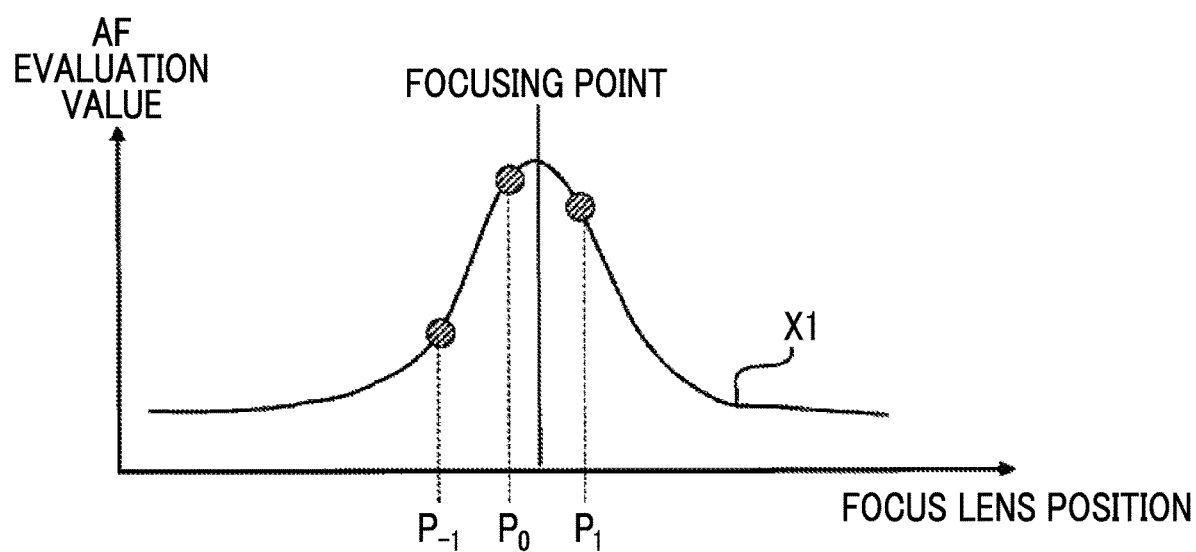
FIG. 3 is a graph showing an example of an AF evaluation value curve.
Figure 4:
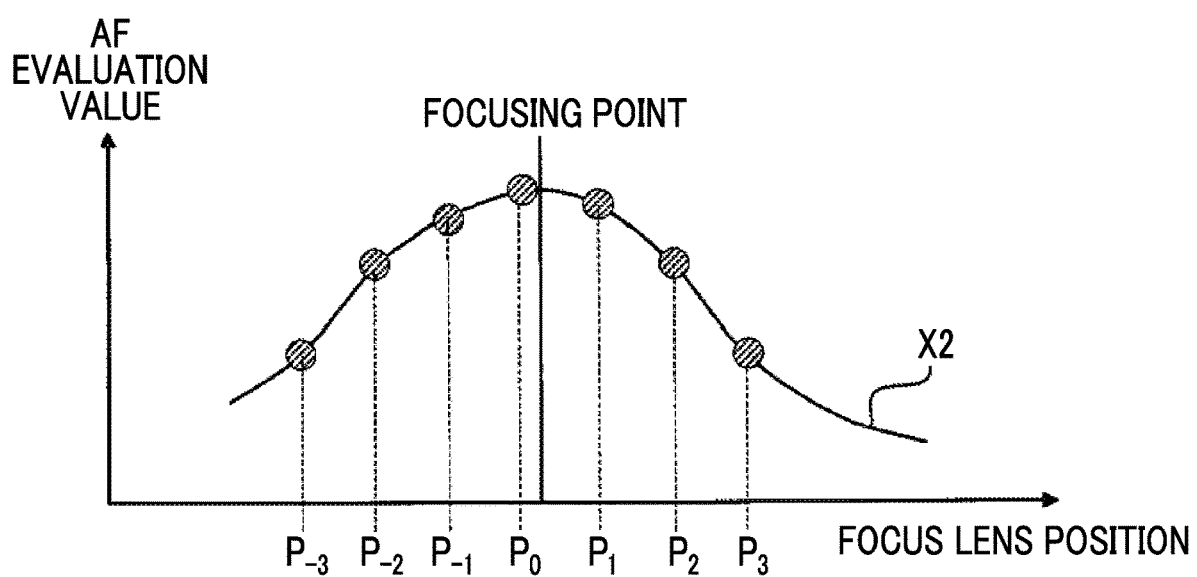
FIG. 4 is a graph showing an example of an AF evaluation value curve.

FIGS. 3 and 4 are graphs showing examples of the AF evaluation value curve. In FIGS. 3 and 4, a horizontal axis represents the position of the focus lens, and a vertical axis represents the AF evaluation value.

FIG. 3 shows an AF evaluation value curve X1 calculated from three AF evaluation values calculated based on the captured image signals acquired by performing the high-pass filtering process in which the lower frequency limit of the passband is high.

In the example of FIG. 3, for example, the three AF evaluation values in total are calculated by using a focus lens position (hereinafter, referred to as an evaluation value maximum position) $P_0$ in which the AF evaluation value becomes maximum among the focus lens positions corresponding to the three AF evaluation values and positions (focus lens positions $P_{-1}$ and $P_1$) including one position on a left side of the AF evaluation value maximum and one position on a right side thereof. The AF evaluation value curve X1 is calculated based on the three AF evaluation values and a predetermined function (a function of multiple orders or more or a Gaussian function).

The focus lens position which is a maximum point of the AF evaluation value curve X1 is determined as the focusing position. The minimum number of AF evaluation values required in the calculation of the AF evaluation value curve is determined by a function used in the acquisition of the AF evaluation value curve.

FIG. 4 shows an AF evaluation value curve X2 calculated from seven AF evaluation values calculated based on the captured image signals acquired by performing the high-pass filtering process in which the lower frequency limit of the passband is smaller than that in the example of FIG. 3.

In the example of FIG. 4, for example, the seven AF evaluation values in total are calculated by using the evaluation value maximum position $P_0$ among the focus lens positions corresponding to the seven AF evaluation values and positions (focus lens positions $P_{-1}$, $P_{-2}$, $P_{-3}$, $P_1$, $P_2$, and $P_3$) including three positions on the left side of the evaluation value maximum position and three positions on the right side thereof. The AF evaluation value curve X2 is calculated based on the seven AF evaluation values and a predetermined function (a function of multiple orders or more or a Gaussian function).

As can be seen through the comparison of FIGS. 3 and 4, in a case where the AF evaluation values are calculated by performing the filtering process in which the lower frequency limit of the passband is low on the captured image signals, there is a tendency for the AF evaluation value curve based on the AF evaluation value to become a gentle curve. As stated above, in a case where the AF evaluation value curve becomes gentle, a change of the AF evaluation value against a change of the focus lens position becomes smaller near the evaluation value maximum position $P_0$, as shown in FIG. 4.

Accordingly, in a case where the AF evaluation value varies due to influence such as image noise, there is a high possibility that the AF evaluation value curve calculated by using the three AF evaluation values corresponding to the evaluation value maximum position $P_0$ and the positions $P_{-1}$ and $P_1$ on the left and right sides thereof will not match the AF evaluation value curve X2, for example, in FIG. 4.

That is, in a case where the AF evaluation values are calculated by performing the filtering process in which the lower frequency limit of the passband is low, it is possible to accurately determine the focusing position by calculating the evaluation value curve by using the AF evaluation values as much as possible.

For this reason, the focusing position determination unit 192 increases the number of AF evaluation values used in the calculation of the AF evaluation value curve as the lower frequency limit of the passband in the filtering process selected by the evaluation value calculation unit 191 becomes lower.

Hereinafter, an example of the method of calculating the maximum point of the AF evaluation value curve by means of the focusing position determination unit 192 will be described. For example, in a case where the AF evaluation value used in the calculation of the AF evaluation value curve is $V_i$, the focus lens position in which the AF evaluation value $V_i$ is acquired is $P_i$, and the AF evaluation value curve follows the Gaussian function, the relationship of the following Expression (1) is acquired.

[Expression 1]

$$V_i = a \cdot \exp\left(-\frac{(P_i - m)^2}{2 \cdot \sigma^2}\right) \qquad (1)$$

The following Expression (2) is acquired by acquiring natural logarithms on both sides of Expression (1) and transforming Expression (1) into a quadratic function for $P_i$.

[Expression 2]

$$\begin{aligned}
\log V_i &= \log a - \frac{(P_i - m)^2}{2 \cdot \sigma^2} \\
&= -\frac{1}{2 \cdot \sigma^2} P_i^2 + \frac{m}{\sigma^2} P_i + \log a - \frac{1}{2}\left(\frac{m}{\sigma}\right)^2 \\
&\equiv \alpha \cdot P_i^2 + \beta \cdot P_i + \gamma
\end{aligned} \qquad (2)$$

$$\alpha = -\frac{1}{2 \cdot \sigma^2}$$

$$\beta = \frac{m}{\sigma^2}$$

$$\gamma = \log a - \frac{1}{2}\left(\frac{m}{\sigma}\right)^2$$

The following Expression (3) is acquired by transforming Expression (2).

$$\log v_i = \alpha(P_i^2 + \beta/\alpha \cdot P_i) + \gamma = \alpha(P_i + \beta/2\alpha)^2 + \gamma - \beta^2/4\alpha \quad (3)$$

$P_i=-\beta/2\alpha$ is a peak position (maximum point) of the Gaussian function from Expression (3).

The Gaussian function indicating the AF evaluation value curve can be acquired by calculating $\alpha$, $\beta$, and $\gamma$ of Expression (3) by the method of least squares, and the maximum point can be calculated from $\alpha$ and $\beta$. For example, the focusing position determination unit 192 calculates the AF evaluation value curve and the maximum point thereof by such a method.

Hereinafter, an AF operation of the digital camera shown in FIG. 1 will be described.

Figure 5:
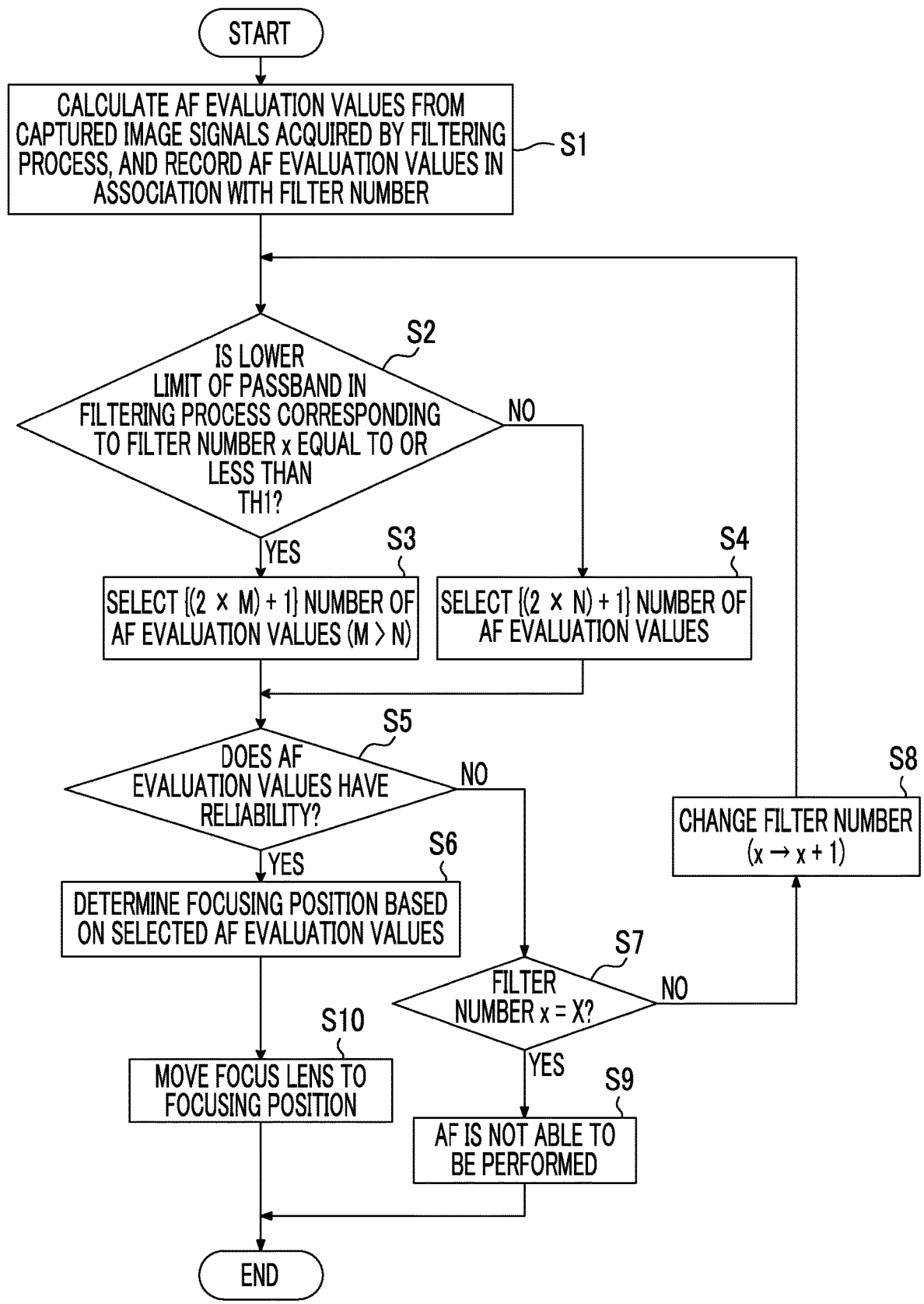
FIG. 5 is a flowchart for describing an AF process of the digital camera by means of the system control unit 11 shown in FIG. 1.

FIG. 5 is a flowchart for describing an AF process of the digital camera by means of the system control unit 11 shown in FIG. 1. An instruction to perform AF is input to the system control unit 11 by half pressing a shutter button of the operating unit 14, and thus, the flowchart shown in FIG. 5 is started.

The system control unit 11 moves the focus lens from one end of a movable range to the other end based on the instruction of the AF. The subject is captured by the imaging element 5 in the movement positions of the focus lens while the focus lens moves, and the captured image signals acquired through the imaging are input to the evaluation value calculation unit 191.

The evaluation value calculation unit 191 performs one filtering process selected from X (X is a natural number of 2 or greater) number of filtering processes in which passbands are different on the captured image signals acquired in the input focus lens positions, and performs an evaluation value calculation step of calculating the AF evaluation values based on the captured image signals acquired by performing the filtering process.

The evaluation value calculation unit 191 performs an AF evaluation value calculation recording process of storing the calculated AF evaluation values, the focus lens positions in a case where the captured image signals used in the calculation of the AF evaluation values are acquired, and a filter number for specifying the filtering process used in the calculation of the AF evaluation values in association with each other in the main memory 16 (step S1).

The evaluation value calculation unit 191 repeatedly performs the AF evaluation value calculation recording process while sequentially changing different filtering processes to be selected. Accordingly, the focus lens positions and the AF evaluation values in these positions are recorded in association with a filter number x (x=0, 1, . . . , and X) of the X number of filtering processes.

Subsequently, the focusing position determination unit 192 reads the AF evaluation value corresponding to the filter number of x=0 out of the main memory 16, and determines whether or not the lower frequency limit of the passband in the filtering process corresponding to the filter number of x=0 is equal to or less than a frequency threshold value TH1 (step S2).

In a case where the determination result of step S2 is NO, the focusing position determination unit 192 selects {(2× N)+1} number of AF evaluation values in total by using the AF evaluation value corresponding to the evaluation value maximum position among the readout AF evaluation values and (2×N) number of AF evaluation values corresponding to N number of focus lens positions on the left side of the evaluation value maximum position and N number of focus lens positions on the right side thereof, as the AF evaluation values used in the calculation of the maximum point of the AF evaluation value curve (step S4).

In a case where the determination result of step S2 is YES, the focusing position determination unit 192 selects {(2× M)+1} number of AF evaluation values in total by using the AF evaluation value corresponding to the evaluation value maximum position among the readout AF evaluation value and (2×M) number of AF evaluation values corresponding to M (M>N) number of focus lens positions on the left side of the evaluation value maximum position and M number of focus lens positions on the right side thereof, as the AF evaluation values used in the calculation of the maximum point of the AF evaluation value curve (step S3).

For example, in a case where M is equal to 3 in step S3, the AF evaluation values corresponding to the focus lens positions $P_{-3}$, $P_{-2}$, $P_{-1}$, $P_0$, $P_1$, $P_2$, and $P_3$ are selected in the example of FIG. 4.

For example, in a case where N=2 in step S4, the AF evaluation values corresponding to the focus lens positions $P_{-2}$, $P_{-1}$, $P_0$, $P_1$, and $P_2$ are selected in the example of FIG. 4.

After step S3 or step S4, the focusing position determination unit 192 determines the reliability of the focusing position determined by these AF evaluation values based on the selected AF evaluation values (step S5).

Since the maximum point of the AF evaluation value curve is accurately determined as a shape near a peak of a data curve constituted by the AF evaluation values used for calculating the AF evaluation value curve becomes steeper, the reliability of the focusing position increases. For example, the following two methods are used as a method of determining the reliability of the focusing position, and the present embodiment is not limited thereto.

(First Reliability Determination Method)

In a case where the following Expression (4) is established by expressing the maximum AF evaluation value of the selected AF evaluation values by Vmax, the minimum AF evaluation value by Vmin, and the threshold value by TH1, the focusing position determination unit 192 determines that the data curve constituted by the selected AF evaluation values becomes steep near the peak, that is, the reliability of the focusing position determined by the selected AF evaluation values is equal to or higher than a reliability threshold value.

$$(V\text{max}-V\text{min})/V\text{max}>TH1 \quad (4)$$

(Second Reliability Determination Method)

In a case where the selected AF evaluation values monotonically decrease on the left and right sides of the evaluation value maximum position, the focusing position determination unit 192 determines that the data curve constituted by the selected AF evaluation values becomes steep near the peak, that is, the reliability of the focusing position determined by the selected AF evaluation values is equal to or higher than the reliability threshold value.

For example, an example in which the seven AF evaluation values shown in FIG. 4 are selected in step S3 will be described.

In a case where the following Expressions (5) and (6) are established for the relationship between the focus lens positions $P_{-3}$, . . . , $P_{-1}$, $P_0$, $P_1$, . . . , $P_3$ corresponding to the selected AF evaluation values, the focusing position determination unit 192 determines that the reliability of the focusing position determined by the seven AF evaluation values is equal to or higher than the reliability threshold value.

$$P_0 > P_{-1} > \ldots P_{-3} \quad (5)$$

$$P_0 > P_1 > \ldots P_3 \quad (6)$$

In a case where the conditions of Expressions (5) and (6) are satisfied and a difference (an absolute value without regard to its sign) between the AF evaluation values corresponding to two neighboring focus lens positions is equal to or greater than a threshold value, the focusing position determination unit may determine that the reliability of the focusing position determined by the seven AF evaluation values is equal to or higher than the reliability threshold value.

In a case where it is determined that the reliability of the focusing position determined by the selected AF evaluation values is equal to or higher than the reliability threshold value and the determined focusing position has reliability (step S5: YES), the focusing position determination unit 192 calculates the maximum point of the AF evaluation value curve based on the selected AF evaluation values, and determines the focus lens position corresponding to the calculated maximum point, as the focusing position (step S6).

Steps S2, S3, S4, S5, and S6 constitute a focusing position determination step.

After step S6, the focusing control unit 193 moves the focus lens to the focusing position determined in step S6 (step S10), and the AF operation is ended. Step S10 constitutes a focusing control step.

In a case where it is determined that the reliability of the focusing position determined by the selected AF evaluation values is lower than the reliability threshold value and the determined focusing position does not have reliability (step S5: NO), the focusing position determination unit 192 determines whether or not the filter number x=X (step S7).

In a case where the determination result of step S7 is NO, the focusing position determination unit 192 changes the filter number to (x+1) by increasing the filter number x by one (step S8), and the process returns to step S2.

In a case where the determination result of step S7 is YES, the focusing position determination unit 192 determines that focusing is not able to be performed (step S9), and the AF operation is ended. In this case, the system control unit 11 may display information indicating that AF is not able to be performed on the display unit 23.

As stated above, according to the digital camera of FIG. 1, the AF evaluation values of the focus lens positions are acquired by using a plurality of filtering processes, and the number of AF evaluation values used in the calculation of the maximum point of the AF evaluation value curve increases in a case where the filtering process in which the lower frequency limit of the passband is low is used. Thus, it is possible to improve the calculation accuracy of the maximum point of the AF evaluation value curve.

Accordingly, it is possible to accurately focus on even a subject having low contrast and low frequency, such as cloud. In a case where the filtering process in which the lower frequency limit of the passband is high is used, since the number of AF evaluation values used in the calculation of the maximum point of the AF evaluation value curve is decreased, a calculation amount is reduced, and thus, it is possible to increase a speed of the AF process.

In the above-described processes, step S2 and the subsequent processes are performed in ascending order of the filter number x. As for a case where the maximum point of the AF evaluation value curve is calculated based on the AF evaluation values corresponding to the filtering process in which the lower frequency limit of the passband is high and a case where the maximum point of the AF evaluation value curve is calculated based on the AF evaluation values corresponding to the filtering process in which the lower frequency limit of the passband is low, there is a tendency for the AF evaluation value curve to become steep near the peak and the focusing accuracy easily becomes high in the former case.

Thus, the focusing position determination unit 192 may sequentially select the filter number of the filtering process in which the lower frequency limit of the passband is high, and may perform step S2 and the subsequent processes. Accordingly, it is possible to increase the speed of the AF process by increasing a probability that the determination result of step S5 will be YES.

The digital camera of FIG. 1 selects the AF evaluation values, and determines the reliability of the focusing position based on the selected AF evaluation values. Since it is determined that the focusing position based on the selected AF evaluation values only in a case where the determined reliability is high, it is possible to improve AF accuracy.

The focusing position determination unit 192 may use a number designated by the user or a number automatically set according to an imaging scene, as the filter number to be set in step S2 of FIG. 5. In this case, after step S3 or S4, the process of step S6 may be performed.

As mentioned above, the focusing position may be determined with high accuracy even in a case where the filtering process is previously determined in a manual operation or in an automatic manner on the captured image signals in order to calculate the AF evaluation values.

Although it has been described above that one frequency threshold value is set for the lower frequency limit of the passband in the filtering process, the frequency threshold values may be set in multiple stages.

For example, a filtering process in which three kinds of lower frequency limits F1, F2, and F3 (F1>F2>F3) are set as the lower frequency limit of the passband and two frequency threshold values TH1a (F1>TH1a≥F2) and TH1b (F2>TH1b≥F3) are set as the frequency threshold value is considered.

In this case, it is assumed that the number of selected AF evaluation values is Sa in a case where the filtering process in which the lower frequency limit is F1 is selected, the number of selected AF evaluation values is Sb in a case where the filtering process in which the lower frequency limit is F2 is selected, and the number of selected AF evaluation values is Sc in a case where the filtering process in which the lower frequency limit is F3 is selected. Sa<Sb<Sc is satisfied, and thus, the focusing position determination unit 192 can improve AF accuracy by improving the calculation accuracy of the AF evaluation value curve.

Hereinafter, modification examples of the digital camera shown in FIG. 1 will be described.

(First Modification Example)

Figure 6:
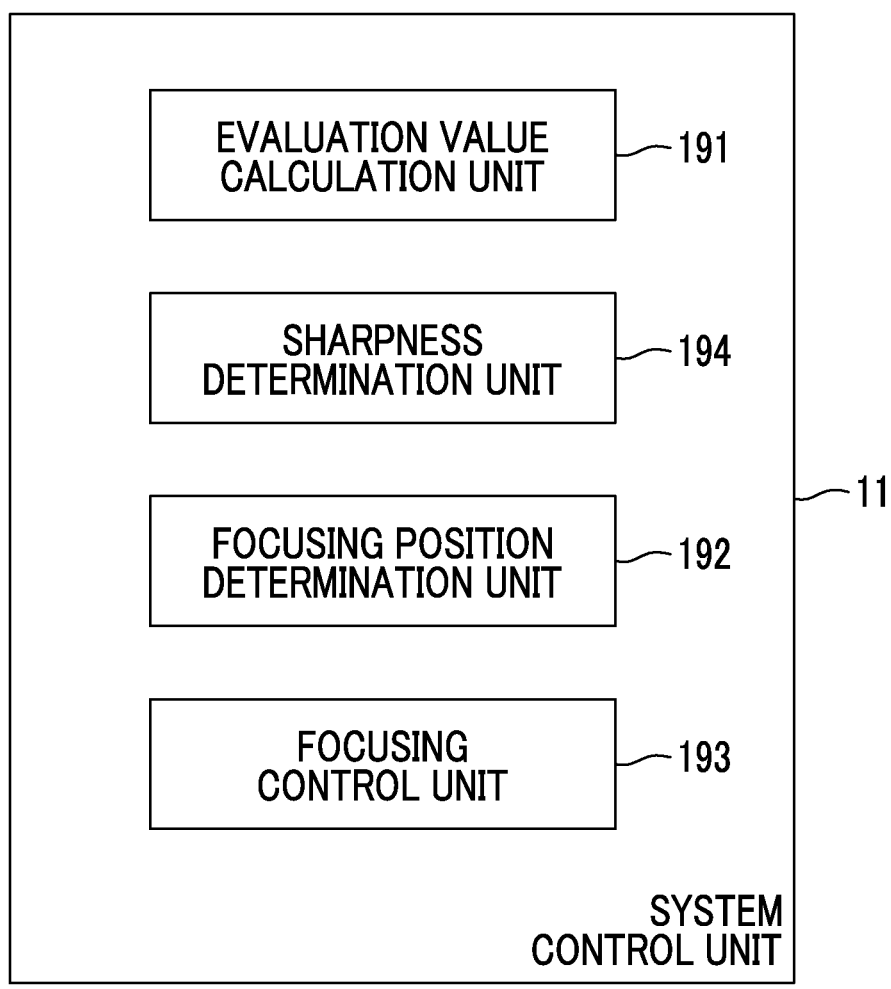
FIG. 6 is a functional block diagram showing a modification example of the system control unit 11 of the digital camera of FIG. 1.

FIG. 6 is a functional block diagram showing a modification example of the system control unit 11 of the digital camera of FIG. 1. A sharpness determination unit 194 is newly added to the system control unit 11 shown in FIG. 6, and other functional blocks are basically the same as those shown in FIG. 2.

The sharpness determination unit 194 determines sharpness of a curve (hereinafter, referred to as a determination evaluation value curve) indicating the relationship between the movement range and the AF evaluation values corresponding to a predetermined movement range of the focus lens including the evaluation value maximum position in which the maximum AF evaluation value is acquired among the AF evaluation values calculated by the evaluation value calculation unit 191 based on the AF evaluation values corresponding to the predetermined movement range.

As the shape of the AF evaluation value curve near the peak is elongated toward the peak as described in FIGS. 3 and 4, it is possible to determine the focusing position with high accuracy.

FIGS. 3 and 4 show the results acquired while changing the filtering processes, and it is possible to distinguish between the state of FIG. 3 and the state of FIG. 4 without using information of the lower frequency limit of the passband in the filtering process.

The focusing position determination unit 192 of the system control unit 11 shown in FIG. 6 determines whether the AF evaluation value curve is in the state of FIG. 3 or the state of FIG. 4 based on the sharpness of the determination evaluation value curve, and increases the number of AF evaluation values to be selected in order to calculate the maximum point of the AF evaluation value curve as the determined sharpness becomes lower.

Since the sharpness of the determination evaluation value curve has a positive correlation with the lower frequency limit of the passband in the filtering process, the focusing position determination unit 192 improve the calculation accuracy of the maximum point of the AF evaluation value curve by determining the number of AF evaluation values used in the calculation of the maximum point of the AF evaluation value curve by using the sharpness instead of the frequency characteristics of the filtering process.

The following two methods are used as a method of determining the sharpness by means of the sharpness determination unit 194.

(First Sharpness Determination Method)

The sharpness determination unit 194 determines the sharpness of the determination evaluation value curve based on the number of AF evaluation values which exceed the threshold value. The sharpness determination method will be described in more detail with reference to FIGS. 7 and 8.

Figure 7:
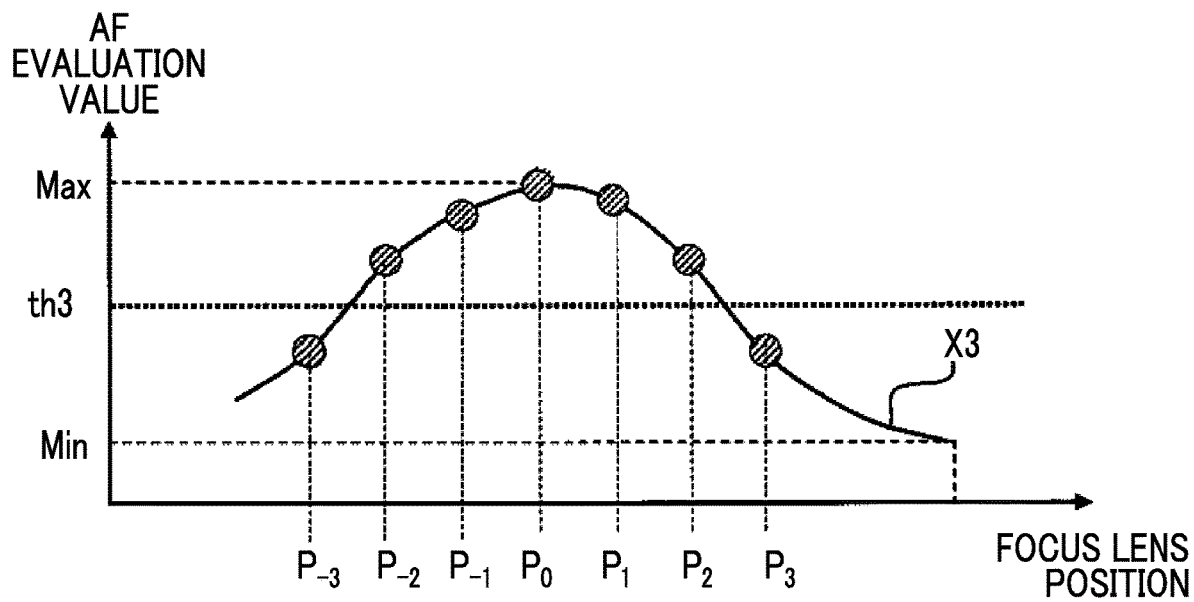
FIG. 7 is a graph showing an example of AF evaluation values calculated by an evaluation value calculation unit.
Figure 8:
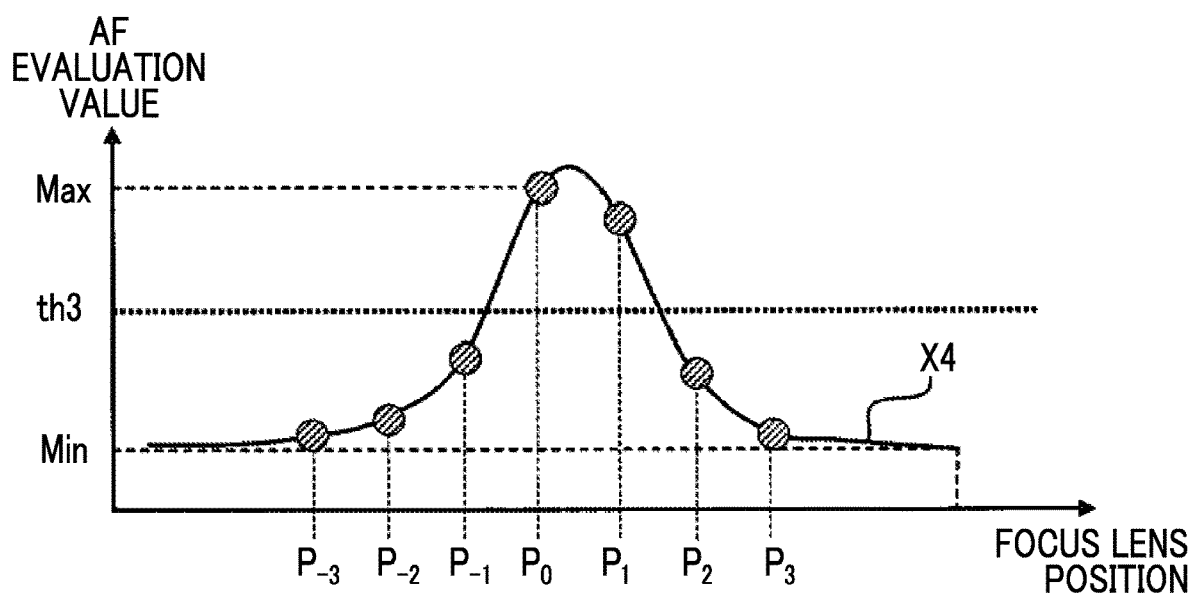
FIG. 8 is a graph showing an example of the AF evaluation values calculated by an evaluation value calculation unit.

FIGS. 7 and 8 shows examples in which seven AF evaluation values corresponding to positions of a range (range of $P_{-3}$ to $P_3$) including three positions on the left side of the evaluation value maximum position $P_0$ and three positions on the right side thereof are extracted as a predetermined movement range of the focus lens including the evaluation value maximum position $P_0$ corresponding to the maximum AF evaluation value among the AF evaluation values calculated by the evaluation value calculation unit 191.

This movement range may be a range which is equal to or greater than the range including the evaluation value maximum position $P_0$, one position on the left side of the evaluation value maximum position $P_0$, and one position on the right side thereof, and is not particularly limited.

Among the seven AF evaluation values shown in FIG. 7, the number of AF evaluation values which exceed a threshold value th3 is large. It may be determined that the curve (determination evaluation value curve) passing through the seven AF evaluation values has low sharpness.

Among the seven AF evaluation values shown in FIG. 8, the number of AF evaluation values which exceed the threshold value th3 is small. It may be determined that the curve (determination evaluation value curve) passing through the seven AF evaluation values has high sharpness.

For example, in a case where the maximum AF evaluation value is Max among the AF evaluation values corresponding to the movement range and the minimum AF evaluation value is Min, the threshold value th3 is calculated by the following Expression (7). A variable A is a preset value, and is designated by % units. As a value of the variable A becomes larger, the threshold value th3 approximates Max.

$$th3=\{(\text{Max}-\text{Min})\times A/100\}+\text{Min} \qquad (7)$$

(Second Sharpness Determination Method)

In a case where the AF evaluation value corresponding to the movement range is $V_i$, the focus lens position in which the AF evaluation value $V_i$ is acquired is $P_i$, and the determination evaluation value curve follows the Gaussian function, the following Expression (1) is acquired. Thus, the sharpness determination unit 194 calculates σ of the determination evaluation value curve by Expression (1).

σ calculated in this manner represents the spread of the determination evaluation value curve, and is a value in inverse proportion to the sharpness of the curve. That is, it may be determined that the sharpness is low as σ becomes larger.

Figure 9:
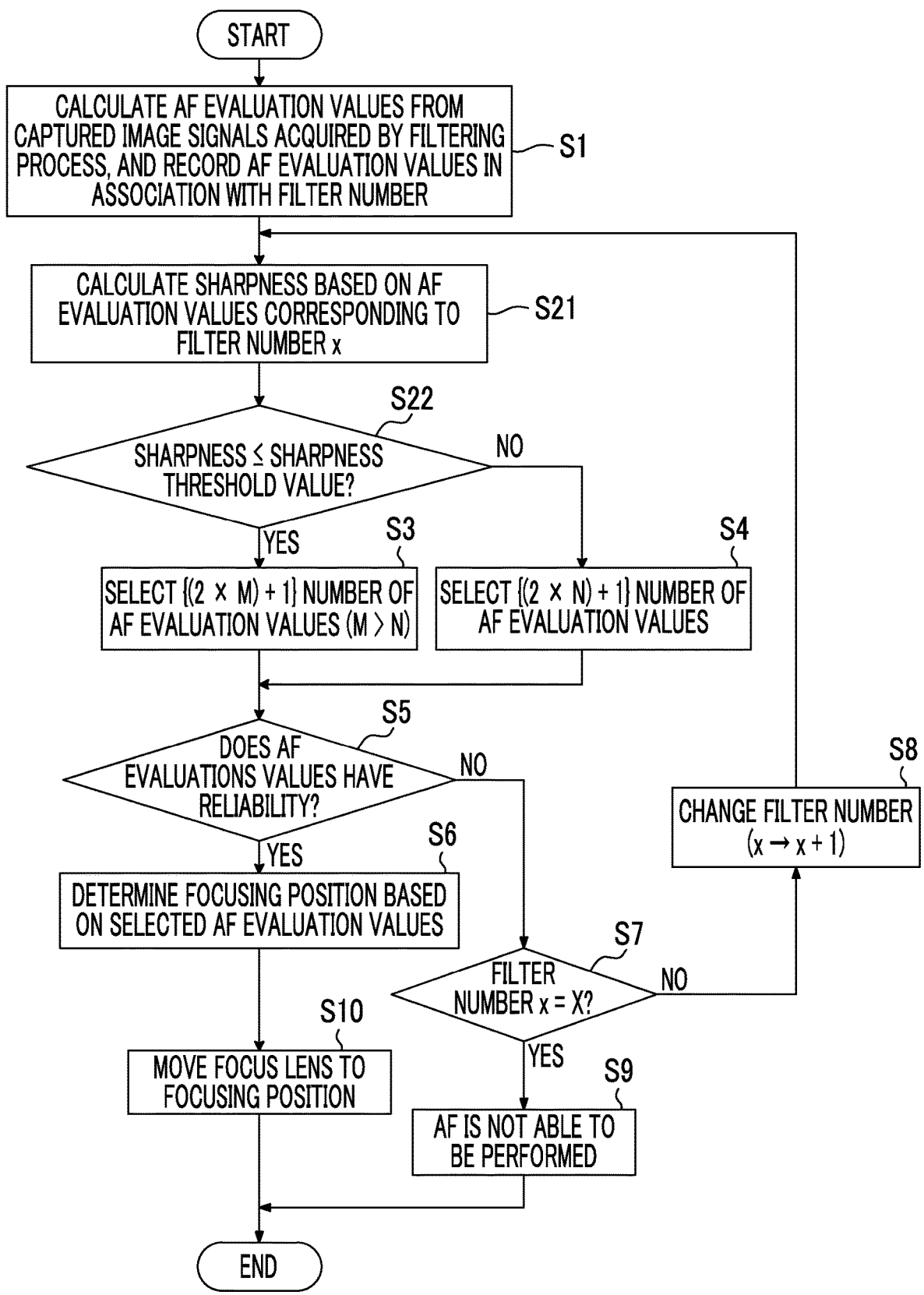
FIG. 9 is a flowchart for describing the AF process of the digital camera by means of the system control unit 11 shown in FIG. 6.

FIG. 9 is a flowchart for describing the AF process of the digital camera by means of the system control unit 11 shown in FIG. 6.

The flowchart shown in FIG. 9 is different from the flowchart shown in FIG. 5 in which step S2 is changed to step S22 and step S21 is added, and other steps are the same as those in the flowchart shown in FIG. 5. In FIG. 9, the same processes as those shown in FIG. 5 will be assigned the same references, and the description thereof will be omitted.

In the AF process shown in FIG. 9, after step S1, the sharpness determination unit 194 reads out the AF evaluation values corresponding to the filter number x stored in the main memory 16, and calculates the sharpness based on at least a part of the readout AF evaluation values by the aforementioned method (step S21). Step S21 constitutes a sharpness determination step.

Subsequently, the sharpness determination unit 194 determines whether or not the calculated sharpness is equal to or lower than a sharpness threshold value (step S22).

In a case where it is determined that the sharpness is equal to or lower than the sharpness threshold value (step S22: YES), the process of step S3 is performed, and in a case where it is determined that the sharpness exceeds the sharpness threshold value (step S22: NO), the process of step S4 is performed.

Step S3, step S4, and the subsequent processes are the same as the processes described in FIG. 5. Steps S22, S3, S4, S5, and S6 constitute a focusing position determination step.

As stated above, according to the digital camera according to the first modification example, the sharpness of the determination evaluation value curve indicating the relationship between the movement range of the focus lens corresponding to at least a part of a plurality of AF evaluation values calculated by the evaluation value calculation unit 191 and the AF evaluation values corresponding to the movement range based on at least a part of the AF evaluation values.

In a case where the determination sharpness is low, since the number of AF evaluation values used in the calculation of the AF evaluation value curve is large, it is possible to improve the calculation accuracy of the maximum point of the AF evaluation value curve. In a case where the determined sharpness is high, since the number of AF evaluation values used in the calculation of the maximum point of the AF evaluation value curve is small, the calculation amount is reduced, and thus, it is possible to increase the speed of the AF process.

(Second Modification Example)

It has been described above that a difference between the distributions of the AF evaluation values is generated even for the same subject by changing the filtering process as shown in FIGS. 3 and 4. However, even though the same filtering process is used, a difference between the distributions of the AF evaluation values may be generated in certain spatial frequency or contrast of the subject as shown in FIGS. 3 and 4.

For example, in a case where one kind of filtering process is fixed as the filtering process performed by the evaluation value calculation unit 191, the distribution of the AF evaluation values shown in FIG. 4 may be acquired in a case where the subject having low spatial frequency or contrast is captured, and the distribution of the AF evaluation values shown in FIG. 3 may be acquired in a case where the subject having high spatial frequency or contrast is captured.

Accordingly, even in this case, the changing of the number of AF evaluation values used in the calculation of the maximum point of the AF evaluation value curve based on the sharpness calculated by the sharpness determination unit 194 is effective.

The digital camera according to the second modification example changes the evaluation value calculation unit 191 of the digital camera according to the first modification example to an evaluation value calculation unit which performs not the plurality of filtering processes but a single filtering process on the captured image signals and calculates the AF evaluation values based on the captured image signals acquired by performing this filtering process.

Figure 10:
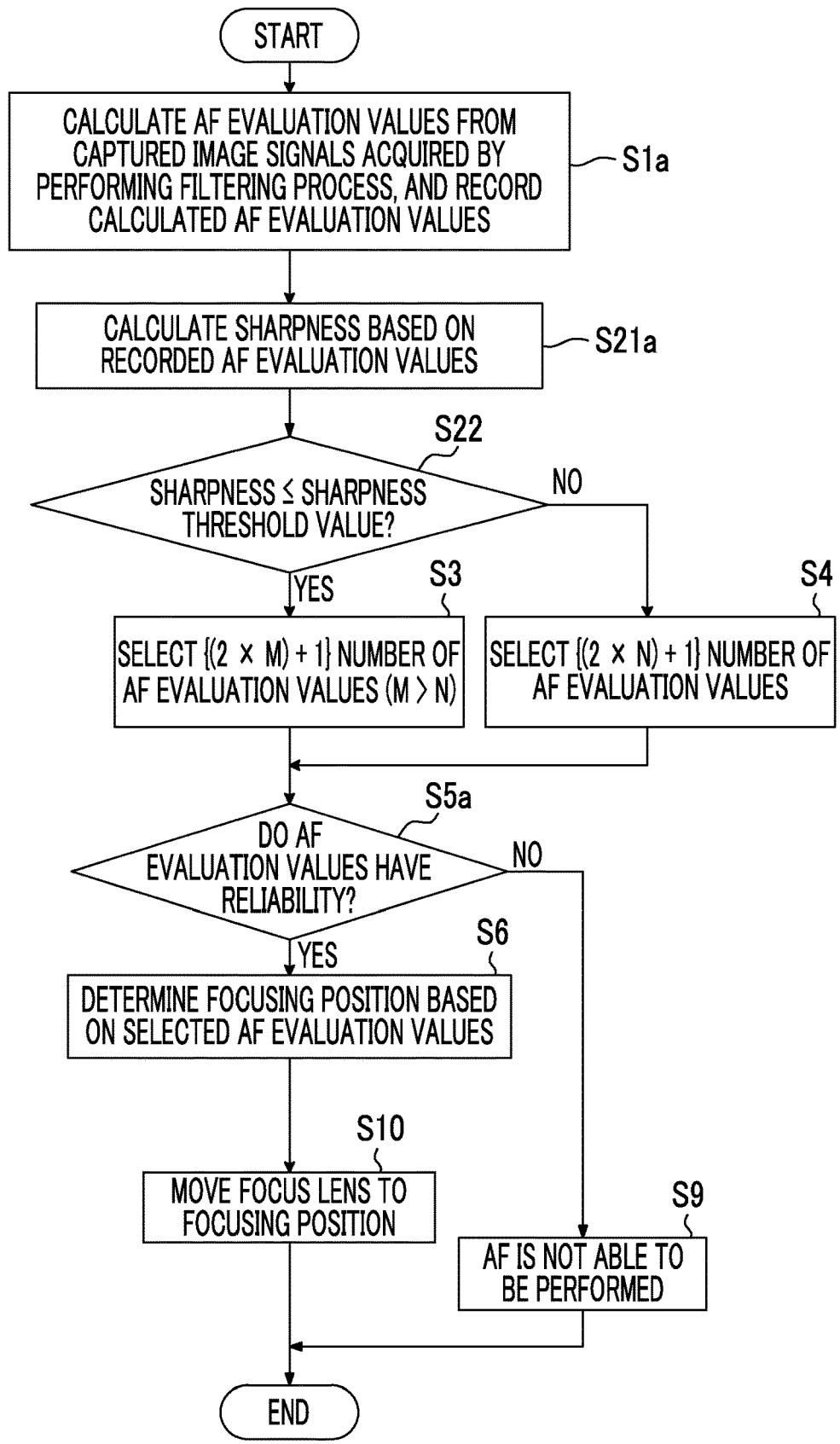
FIG. 10 is a flowchart for describing an AF process of a digital camera according to a second modification example.

FIG. 10 is a flowchart for describing the AF process of the digital camera according to the second modification example. The flowchart shown in FIG. 10 is different from the flowchart shown in FIG. 9 in that step S1 is changed to step S1a, step S21 is changed to step S21a, step S5 is changed to step S5a, and steps S7 and S8 are removed. In FIG. 10, the same processes as those shown in FIG. 9 will be assigned the same references, and the description thereof will be omitted.

In step S1a of FIG. 10, the evaluation value calculation unit 191 performs an evaluation value calculation step of calculating the AF evaluation values of the focus lens positions based on the captured image signals processed through the predetermined fixed filtering process.

In the next step S21a, the sharpness determination unit 194 calculates the sharpness based on at least a part of the AF evaluation values calculated in step S1a. Step S21a constitutes a sharpness determination step.

In a case where the determination result of step S22 is YES, the focusing position determination unit 192 selects {(2×M)+1} number of AF evaluation values among the AF evaluation values recorded in step S1a. In a case where the determination result of step S22 is NO, the focusing position determination unit 192 selects {(2×N)+1} number of AF evaluation values among the AF evaluation values recorded in step S1a.

Thereafter, in a case where the determination result is NO in step S5a, the process of step S9 is performed, and in a case where the determination is YES, step S6 and the subsequent process are performed. Steps S22, S3, S4, S5a, and S6 constitute a focusing position determination step.

As stated above, even though the plurality of filtering processes is not used in a case where the AF evaluation values are calculated, it is possible to accurately calculate the maximum point of the AF evaluation value curve regardless of the subject, and it is possible to improve the AF accuracy.

In the digital camera according to the first modification example and the digital camera according to the second modification example, the sharpness threshold values to be compared with the sharpness in step S22 of FIGS. 9 and 10 may be set in multiple stages, and the setting of the number of AF evaluation values used in the calculation of the maximum point of the AF evaluation value curve may be changed in multiple stages.

(Third Modification Example)

In the digital camera of FIG. 1, the digital camera according to the first modification example, and the digital camera according to the second modification example, the focusing position determination unit 192 controls the number of AF evaluation values used in the calculation of the maximum point of the AF evaluation value curve based on the sharpness of the determination evaluation value curve or the passband in the selected filtering process.

In a case where the function of multiple orders or more or the Gaussian function is used in the calculation of the AF evaluation value curve, as a shape of a curve (hereinafter, referred to as a data curve) indicating the relationship between the AF evaluation values selected by the focusing position determination unit 192 and the focus lens positions corresponding to the AF evaluation values is symmetric with respect to the evaluation value maximum position or as the shape of the curve is convex in a direction in which the evaluation value increases, the calculation accuracy of the AF evaluation value curve increases.

In the digital camera according to the third modification example, the focusing position determination unit 192 determines the shape of the data curve, and adjusts the number of AF evaluation values used in the calculation of the AF evaluation value curve based on the determined shape. Accordingly, it is possible to further increase focusing accuracy. The configuration of the digital camera according to the third modification example is achieved by partially adding a function to the focusing position determination unit 192 of FIG. 1, and the basic configuration is the same as that of the digital camera of FIG. 1.

Hereinafter, a method of adjusting the AF evaluation values based on the shape of the data curve will be described. The following first adjustment method, second adjustment method, and third adjustment method constitute a focusing position determination step.

(First Adjustment Method)

The focusing position determination unit 192 selects a first evaluation value as a maximum value, second evaluation values acquired in positions from a reference position to an n-th position (n is a natural number of 2 or greater) on one side in the movement direction of the focus lens by using the focus lens position (evaluation value maximum position) in which the first evaluation value is acquired as the reference position, and third evaluation values acquired in positions from the reference position to an n-th position on the other side of the reference position in the movement direction of the focus lens, among the AF evaluation values calculated by the evaluation value calculation unit 191.

As described above, the total number of AF evaluation values to be selected is determined based on the sharpness of the determination evaluation value curve or the passband in the selected filtering process.

Figure 11:
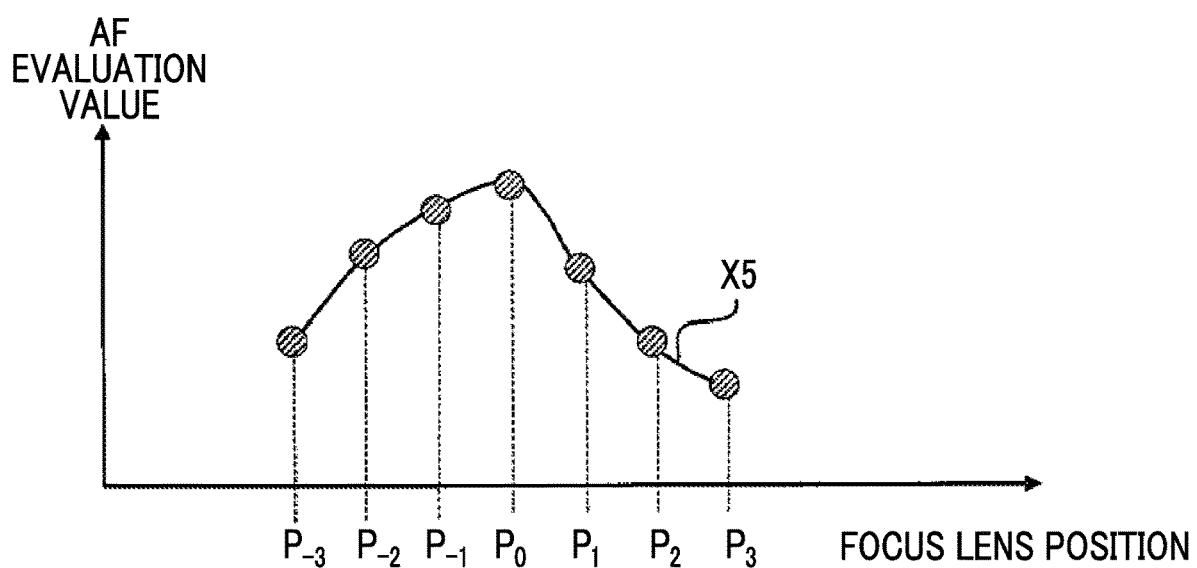
FIG. 11 is a graph showing an example of AF evaluation values selected by a focusing position determination unit.

FIG. 11 is a graph showing an example of the first evaluation value, the second evaluation values, and the third evaluation values selected by the focusing position determination unit 192. Hereinafter, it is assumed that the AF evaluation value acquired in the position $P_i$ (i=−3, −2, −1, 0, 1, 2, 3) is $V(P_i)$. FIG. 11 shows a data curve X5 (a curve acquired by connecting all the AF evaluation values) constituted by all the illustrated AF evaluation values.

In the example of FIG. 11, the AF evaluation value $V(P_0)$ in the evaluation value maximum position $P_0$ is the first evaluation value, the AF evaluation values in the positions $P_1$, $P_2$, and $P_3$ are the third evaluation values, and the AF evaluation values in the positions $P_{-1}$, $P_{-2}$, and $P_{-3}$ are the third evaluation values.

The focusing position determination unit 192 determines the shape of the data curve X5 by determining symmetry between curve portions constituted by two AF evaluation values in positions separated from the evaluation value maximum position by two or more positions in both directions and AF evaluation values acquired in adjacent positions closer to the evaluation value maximum position than these separated positions in the data curve X5.

In a case where the symmetry of the curve portion is lower than a symmetry threshold value, the focusing position determination unit 192 excludes the AF evaluation value far from the evaluation value maximum position among the AF evaluation values constituting the curve portions and AF evaluation values corresponding to positions farther from the evaluation value maximum position than the focus lens position corresponding to the far AF evaluation value from the evaluation values used in the calculation of the maximum point.

The exclusion of the evaluation values will be described in detail with reference to FIG. 11.

The focusing position determination unit 192 determines symmetry between a zone $A_1$ of the positions $P_0$ and $P_1$ and a zone $B_1$ of the positions $P_0$ and $P_{-1}$ in the data curve X5 shown in FIG. 11. Subsequently, the focusing position determination unit 192 determines symmetry between a zone $A_2$ of the positions $P_1$ and $P_2$ and a zone $B_2$ of the positions $P_{-1}$ and $P_{-2}$. Thereafter, the focusing position determination unit 192 determines symmetry between a zone $A_3$ of the positions $P_2$ and $P_3$ and a zone $B_3$ of the positions $P_{-2}$ and $P_{-3}$.

A zone $A_k$ is a zone of positions $P_{k-1}$ and $P_k$. A zone $B_k$ is a zone of positions $P_{-k+1}$ and $P_{-k}$.

The symmetry (k=1 to 3) between the zone $A_k$ and the zone $B_k$ is symmetry between a curve portion constituted by the AF evaluation value $V(P_{k-1})$ and the AF evaluation value $V(P_k)$ in the zone $A_k$ and a curve portion constituted by the AF evaluation value $V(P_{-k+1})$ and the AF evaluation value $V(P_{-k})$ in the zone $B_k$.

The focusing position determination unit 192 determines the symmetry between the zone $A_k$ and the zone $B_k$ through the comparison of the slopes of the AF evaluation values in the zones. Slopes $G_a$ and $G_b$ in the zone $A_k$ and $B_k$ are calculated by the following Expressions (8) and (9).

$$G_a = \{V(P_k) - V(P_{k-1})\}/(P_k - P_{k-1}) \quad (8)$$

$$G_b = \{V(P_{-k+1}) - V(P_{-k})\}/(P_{-k+1} - P_{-k}) \quad (9)$$

In a case where all the following expressions (10) to (12) are satisfied, the focusing position determination unit 192 determines that the zone $A_k$ and the zone $B_k$ have symmetry (the symmetry is equal to or higher than the symmetry threshold value). A threshold value th5 is a preset value. In a case where all the following Expressions (10) to (12) are not satisfied, it is determined that the zone $A_k$ and the zone $B_k$ do not have symmetry (the symmetry is lower than the symmetry threshold value).

$$G_a > 0 \quad (10)$$

$$G_b > 0 \quad (11)$$

$$(1/th5) < (G_a/G_b) < th5 \quad (12)$$

The focusing position determination unit 192 determines the symmetry between the zones in this manner, and excludes the AF evaluation value corresponding to the position $P_k$ far from the evaluation value maximum position $P_0$ in the zone $A_k$ and AF evaluation values corresponding to positions farther from the evaluation value maximum position $P_0$ than the position $P_k$ in the calculation of the maximum point in a case where there are the zone $A_k$ and the zone $B_k$ having no symmetry.

Similarly, the focusing position determination unit 192 excludes the AF evaluation value corresponding to the position $P_{-k}$ far from the evaluation value maximum position $P_0$ in the zone $B_k$ and AF evaluation values corresponding to positions farther from the evaluation value maximum position $P_0$ than the position $P_{-k}$ in the calculation of the maximum point.

In a case where it is determined that the zone $A_1$ and the zone $B_1$ do not have symmetry, the focusing position determination unit 192 uses the AF evaluation values $V(P_{-1})$, $V(P_0)$, and $V(P_1)$ corresponding to three positions included in the zone $A_1$ and the zone $B_1$ in the calculation of the maximum point. Accordingly, the maximum point can be calculated by using at least three AF evaluation values.

Figure 12:
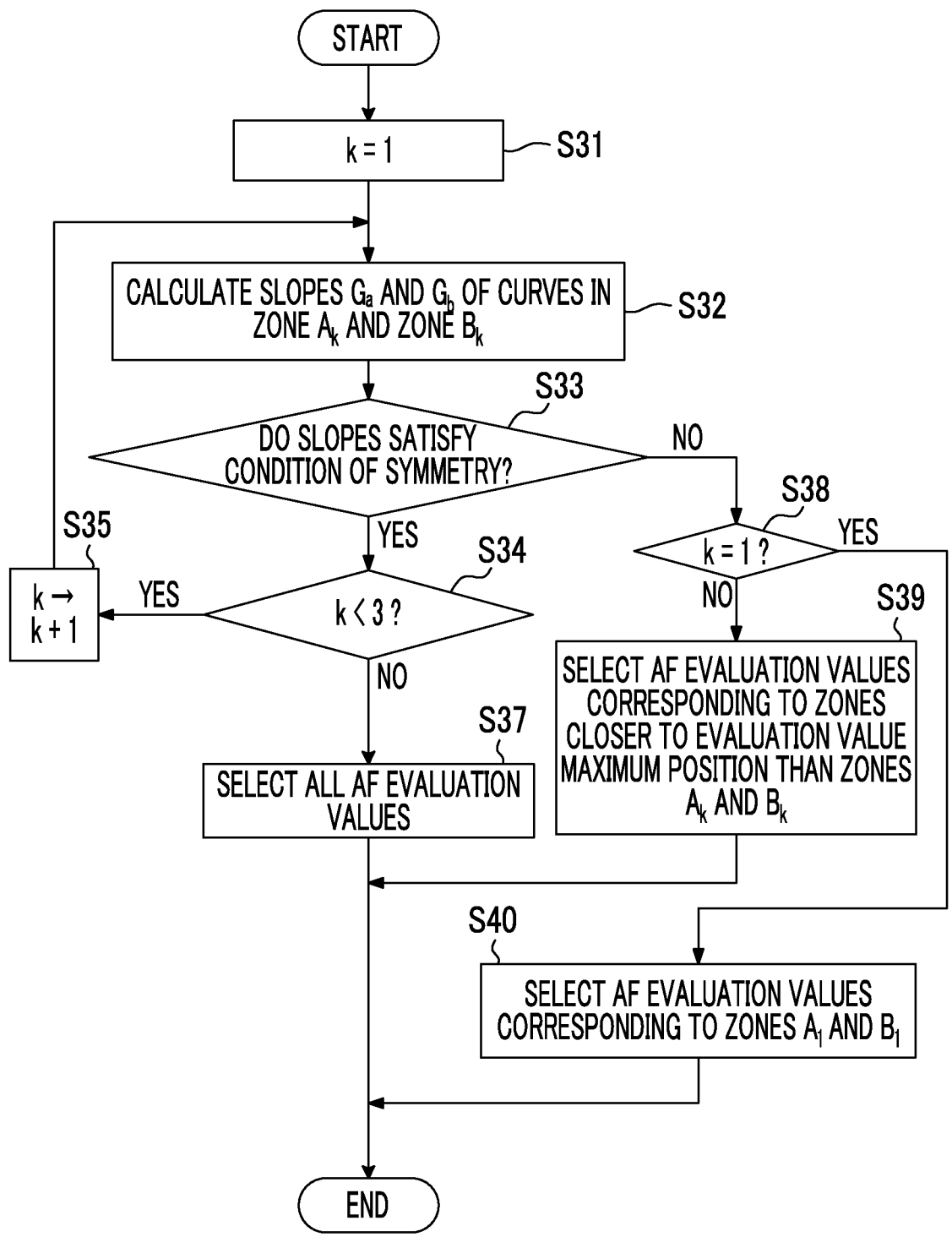
FIG. 12 is a flowchart for describing a first adjustment method of the number of AF evaluation values.

FIG. 12 is a flowchart for describing a first adjustment method. Processes shown in FIG. 12 are added between steps S3, S4, and S5 of the flowchart shown in FIG. 5.

The focusing position determination unit 192 sets 1 to k (step S31), and calculates slopes $G_a$ and $G_b$ of curves of the zone $A_k$ and the zone $B_k$ (step S32).

The focusing position determination unit 192 determines whether or not the slopes Ga and Gb calculated in step S32 satisfy the conditions of Expressions (10) to (12) (step S33). In a case where the conditions are satisfied (step S33: YES), the focusing position determination unit determines whether or not k is smaller than 3, that is, whether or not the zones as symmetry determining targets are present still (step S34).

In a case where it is determined that k is smaller than 3 (step S34: YES), the focusing position determination unit 192 adds 1 to k (step S35). Thereafter, the process returns to step S32, and the aforementioned processes are repeated.

In a case where it is determined that k is equal to 3 (step S34: NO), the focusing position determination unit 192 selects the AF evaluation values corresponding to all the zones, as the AF evaluation values used in the calculation of the maximum point (step S37).

In a case where it is determined that the conditions are not satisfied in step S33 (step S33: NO), the focusing position determination unit 192 determines whether or not k is equal to 1 (step S38). In a case where k is not equal to 1 (step S38: NO), the focusing position determination unit selects AF evaluation values corresponding to all zones closer to the evaluation value maximum position than the zone $A_k$ and the zone $B_k$, as the AF evaluation values used in the calculation of the maximum point (step S39).

In a case where k is equal to 1 (step S38: YES), the focusing position determination unit 192 selects the AF evaluation values corresponding to the zone $A_1$ and the zone $B_1$, as the AF evaluation values used in the calculation of the maximum point (step S40).

As stated above, it is possible to improve determination accuracy of the focusing position by determining the symmetry for all the zones of the data curve and excluding the AF evaluation values corresponding to the zones having no symmetry from targets for calculating the maximum point.

Even though The process flow shown in FIG. 12 are added between steps S3, S4, and S5 of FIG. 9, and between steps S3, S4, and S5a of FIG. 10, it is possible to similarly improve the focusing accuracy.

(Second Adjustment Method)

A second adjustment method is different from the first adjustment method in that the determination method of the symmetry between two zones is different.

The focusing position determination unit 192 performs the determination of the symmetry between the zone $A_k$ and the zone $B_k$ as follows.

Figure 13:
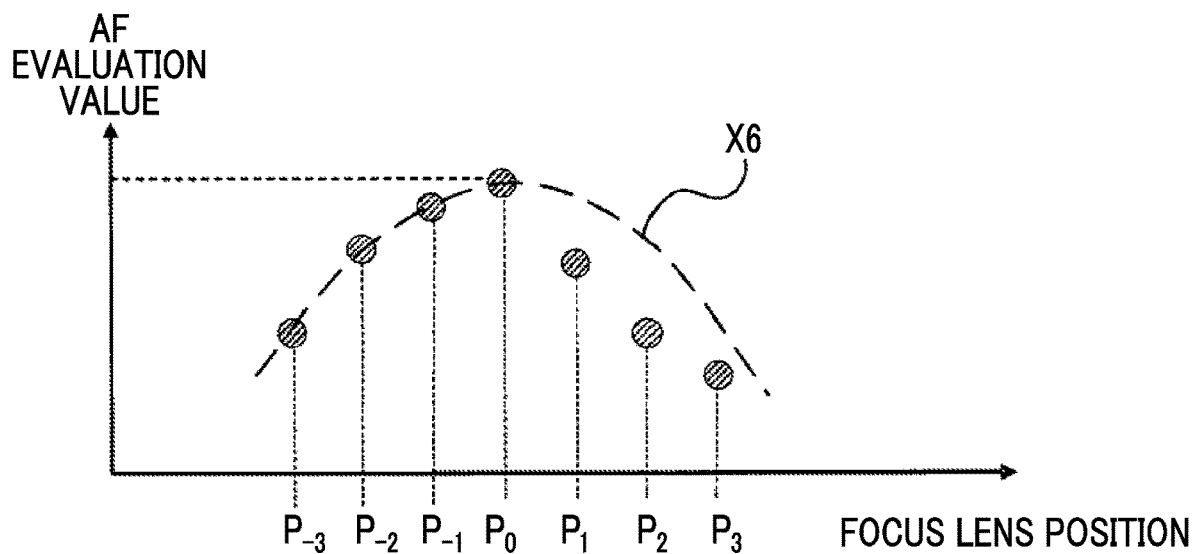
FIG. 13 is a graph showing an example of AF evaluation values selected by the focusing position determination unit.

Initially, the focusing position determination unit 192 calculates a temporary evaluation value curve based on the AF evaluation values corresponding to the zone $B_1$, the zone $B_2$, and the zone $B_3$ (or the zone $A_1$, the zone $A_2$, and the zone $A_3$). The temporary evaluation value curve may be calculated by the same method as that in a case where the AF evaluation value curve is calculated. FIG. 13 shows a temporary evaluation value curve X6 calculated from the AF evaluation values corresponding to the zone $B_1$, the zone $B_2$, and the zone $B_3$.

Subsequently, the focusing position determination unit 192 calculates a difference between the AF evaluation value corresponding to the position $P_k$ in the zone $A_k$ and the temporary evaluation value corresponding to the position $P_k$ of the temporary evaluation value curve.

The focusing position determination unit 192 determines that the symmetry between the zone $A_k$ and the zone $B_k$ is equal to or lower than a symmetry threshold value in a case where the calculated difference exceeds a threshold value th6, and determines that the symmetry between the zone $A_k$ and the zone $B_k$ exceeds the symmetry threshold value in a case where the calculated difference is equal to or less than the threshold value th6. The focusing position determination unit 192 determines the symmetry between the zones while changing k to 1 to 3.

As stated above, it is possible to determine the symmetry between two zones by viewing the difference between the temporary evaluation value and the actual AF evaluation value.

(Third Adjustment Method)

Similarly to the first adjustment method, the focusing position determination unit 192 selects the first evaluation value, the second evaluation values, and the third evaluation values among the AF evaluation values calculated by the evaluation value calculation unit 191.

Figure 14:
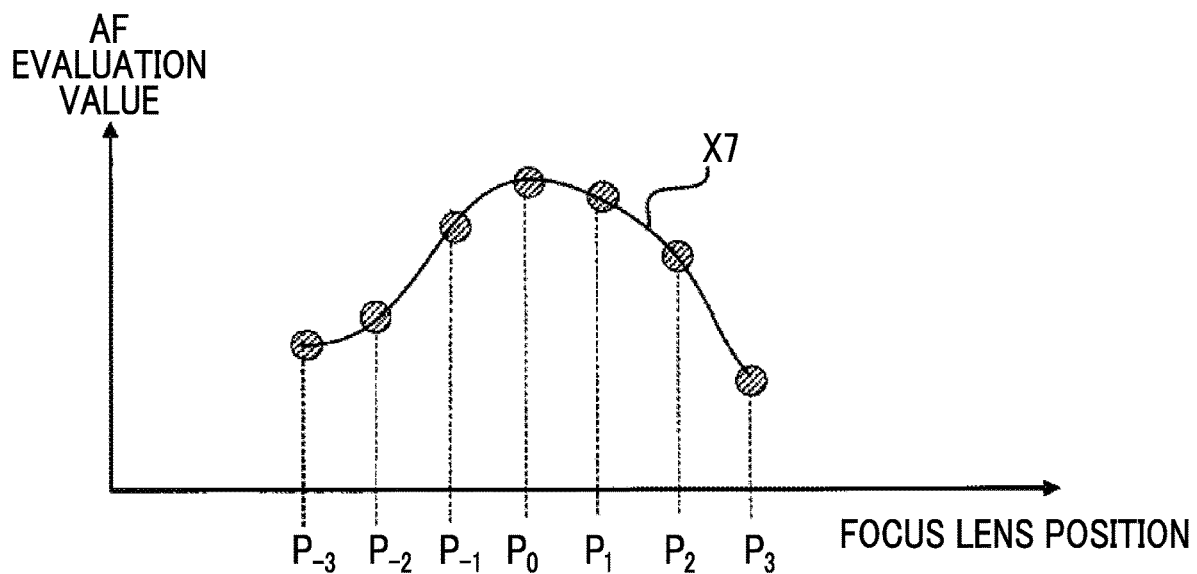
FIG. 14 is a graph showing an example of the AF evaluation values selected by the focusing position determination unit.

FIG. 14 is a graph showing examples of the first evaluation value, the second evaluation values, and the third evaluation values selected by the focusing position determination unit 192. Hereinafter, it is assumed that the AF evaluation value acquired in the position $P_i$ (i=−3, −2, −1, 0, 1, 2, 3) is $V(P_i)$.

FIG. 14 shows a data curve X7 (a curve acquired by connecting all the AF evaluation values) constituted by all the AF evaluation values (not shown).

In the example shown in FIG. 14, the AF evaluation value $V(P_0)$ in the evaluation value maximum position $P_0$ is the first evaluation value, the AF evaluation values in the position $P_1$, the position $P_2$, and the position $P_3$ are the second evaluation values, and the AF evaluation values in the position $P_{-1}$, the position $P_{-2}$, and the position $P_{-3}$ are the third evaluation values.

The focusing position determination unit 192 determines a shape of the data curve X7 by determining steepness of curve portions constituted by AF evaluation values in arbitrary positions separated from the evaluation value maximum position by two or more positions in both directions and AF evaluation values acquired in adjacent positions closer to the evaluation value maximum position than these arbitrary positions in the data curve X7.

In a case where the steepness of the curve portions is lower than a steepness threshold value, the focusing position determination unit 192 excludes the AF evaluation values corresponding to the arbitrary positions and the AF evaluation values corresponding to positions farther from the evaluation value maximum position than the arbitrary positions from the evaluation values used in the calculation of the maximum point.

Specifically, the focusing position determination unit 192 calculates a first change ratio of a first adjacent evaluation value which is the AF evaluation value corresponding to an adjacent position, closer to the evaluation value maximum position than the arbitrary position, to the arbitrary position to the AF evaluation value corresponding to the arbitrary position and a second change ratio of the AF evaluation value acquired at a position adjacent, closer to the evaluation value maximum position than the arbitrary position, to the adjacent position (a position next next the arbitrary position, closer to the evaluation value maximum position than the arbitrary position) to the first adjacent evaluation value.

The focusing position determination unit 192 determines that the steepness of the curve portions is lower than the steepness threshold value in a case where the first change ratio is lower than the second change ratio, and determines that the steepness of the curve portions is equal to or higher than the steepness threshold value in a case where the first change ratio is equal to or greater than the second change ratio.

Hereinafter, the change ratios will be described in detail with reference to the example of FIG. 14.

The focusing position determination unit 192 determines steepness in the zone $A_1$ of the positions $P_0$ and $P_1$, the zone $B_1$ of the positions $P_0$ and $P_{-1}$, the zone $A_2$ of the positions $P_1$ and $P_2$, the zone $B_2$ of the positions $P_{-1}$ and $P_{-2}$, the zone $A_3$ of the positions $P_2$ and $P_3$, and the zone $B_3$ of the positions $P_{-2}$ and $P_{-3}$ in the data curve X7 shown in FIG. 14. A zone $A_k$ is a zone of positions $P_{k-1}$ and $P_k$. A zone $B_k$ is a zone of positions $P_{-k+1}$ and $P_{-k}$.

The steepness in the zones is determined by comparing a change ratio of AF evaluation values in an arbitrary zone with a change ratio of AF evaluation values in an adjacent zone closer to the evaluation value maximum position than the arbitrary zone. In a case where it is assumed that a change ratio of the AF evaluation values in the zone $A_k$ is DiffRatio$A_k$ and a change ratio of the AF evaluation values in the zone $B_k$ is DiffRatio$B_k$, the change ratios are acquired by the following calculation.

| | |
|---|---|
| DiffRatio$B_3$=($V(P_{-2})$−$V(P_{-3})$)/$\|P_{-2}-P_{-3}\|$ | Zone $B_3$: |
| DiffRatio$B_2$=($V(P_{-1})$−$V(P_{-2})$)/$\|P_{-1}-P_{-2}\|$ | Zone $B_2$: |
| DiffRatio$B_1$=($V(P_0)$−$V(P_{-1})$)/$\|P_0-P_{-1}\|$ | Zone $B_1$: |
| DiffRatio$A_1$=($V(P_0)$−$V(P_1)$)/$\|P_0-P_1\|$ | Zone $A_1$: |
| DiffRatio$A_2$=($V(P_1)$−$V(P_2)$)/$\|P_1-P_2\|$ | Zone $A_2$: |
| DiffRatio$A_3$=($V(P_2)$−$V(P_3)$)/$\|P_2-P_3\|$ | Zone $A_3$: |

In a case where the change ratio in each zone is equal to or greater than the change ratio in the zone adjacent to the evaluation value maximum position, this zone is convex upwards (steepness is high). The determination result in the zone having high steepness is OK, and the determination is performed as follows.

Zone $B_3$: OK in case where DiffRatio$B_2 \leq$DiffRatio$B_3$
Zone $B_2$: OK in case where DiffRatio$B_1 \leq$DiffRatio$B_2$
Zone $B_1$: constantly OK (since there is no comparing target for DiffRatio$B_1$, determination result is constantly OK)
Zone $A_1$: constantly OK (since there is no comparing target for DiffRatio$A_1$, determination result is constantly OK)
Zone $A_2$: OK in case where DiffRatio$A_1 \leq$DiffRatio$A_2$
Zone $A_3$: OK in case where DiffRatio$A_2 \leq$DiffRatio$A_3$ The focusing position determination unit 192 determines a range which includes the zone A1 and the zone B1 and in which the zones in which the determination result is OK are continuous for all the zones in which the steepness is determined in this manner, and selects the AF evaluation values corresponding to this range, as the AF evaluation values used in the calculation of the maximum point.

For example, in a case where the following determination result is acquired, the AF evaluation values corresponding to the range of the position $P_{-2}$ to the position $P_3$ are selected.

Zone $B_3$: NG
Zone $B_2$: OK
Zone $B_1$: OK
Zone $A_1$: OK
Zone $A_2$: OK
Zone $A_3$: OK For example, in a case where the following determination results are acquired, the AF evaluation values corresponding to the range of the positions $P_{-1}$ to the position $P_2$ are selected.

Zone $B_3$: OK
Zone $B_2$: NG
Zone $B_1$: OK
Zone $A_1$: OK
Zone $A_2$: OK
Zone $A_3$: NG As stated above, the calculation accuracy of the AF evaluation value curve increases by adjusting the number of AF evaluation values used in the calculation of the maximum point based on the steepness in the zones of the data curve, and thus, it is possible to improve the AF accuracy.

In the third adjustment method, a first evaluation value as the maximum value, second evaluation values acquired in positions from a reference position to an n-th position on one side in the movement direction of the focus lens by using the focus lens position in which the first evaluation value is acquired as the reference position, and third evaluation values acquired in positions from the reference position to an m-th position in which m is a natural number of 1 or greater on the other side in the movement direction of the focus lens may be selected as the AF evaluation values (the AF evaluation values constituting the data curve X7) to be initially selected by the focusing position determination unit 192.

That is, the focusing position determination unit 192 may select the AF evaluation values such that the number of AV evaluation values is equal to each other in left and right directions by using the reference position as the boundary.

Next, the configuration of a smartphone as an imaging device will be described.

Figure 15:
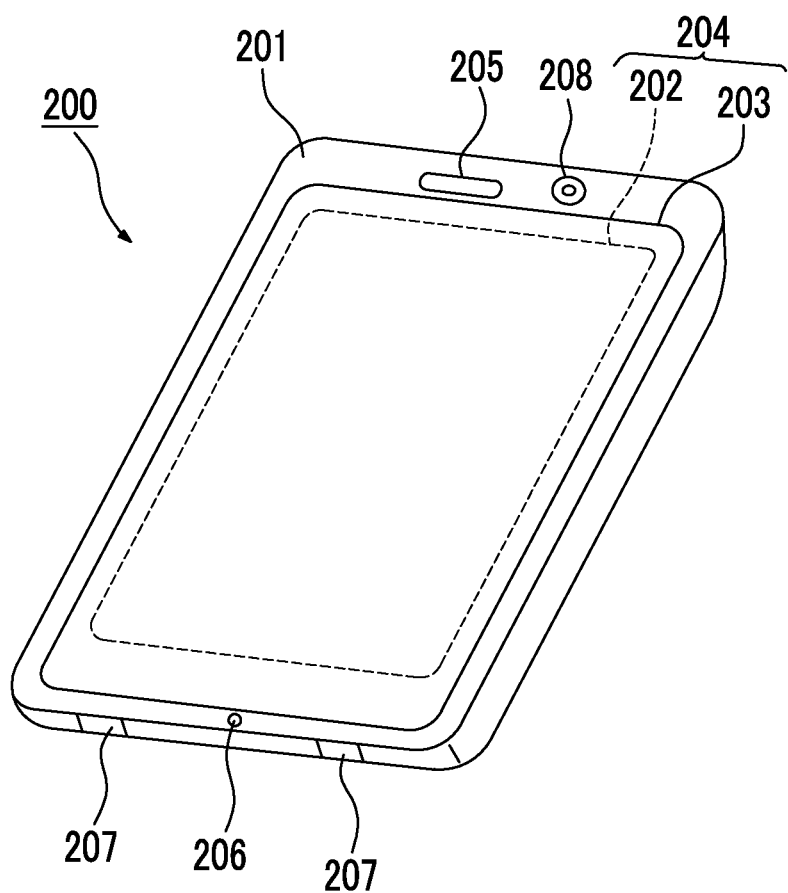
FIG. 15 shows the appearance of a smartphone which is an embodiment of an imaging device of the invention.

FIG. 15 shows the appearance of a smartphone 200 which is an embodiment of an imaging device of the invention. The smartphone 200 shown in FIG. 15 has a flat plate-shaped housing 201, and includes a display input unit 204 in which a display panel 202 as a display unit on one surface of the housing 201 and an operation panel 203 as an input unit are integrated. The housing 201 includes a speaker 205, a microphone 206, an operating unit 207, and a camera unit 208. The configuration of the housing 201 is not limited thereto, and for example, a configuration in which the display unit and the input unit are independent from each other may be employed, or a configuration having a folding structure or a slide mechanism may be employed.

Figure 16:
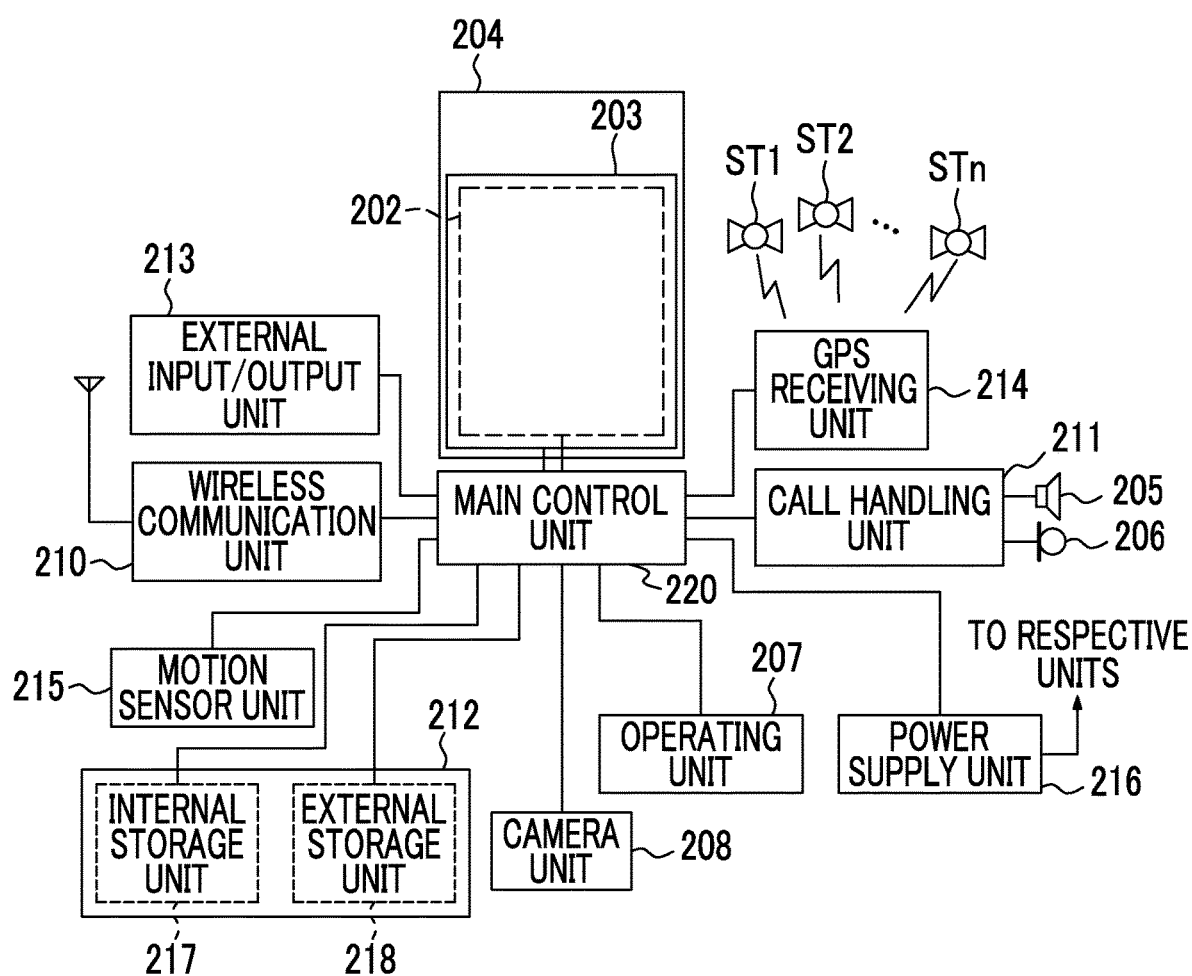
FIG. 16 is an internal block diagram of the smartphone of FIG. 15.

FIG. 16 is a block diagram showing the configuration of the smartphone 200 shown in FIG. 15. As shown in FIG. 16, principal components of the smartphone include a wireless communication unit 210, a display input unit 204, a call handling unit 211, an operating unit 207, a camera unit 208, a storage unit 212, an external input/output unit 213, a global positioning system (GPS) receiving unit 214, a motion sensor unit 215, a power supply unit 216, and a main control unit 220. Principal functions of the smartphone 200 include a wireless communication function of performing mobile wireless communication through a base station device BS (not shown) through a mobile communication network NW (not shown).

The wireless communication unit 210 performs wireless communication with a base station device BS in the mobile communication network NW according to an instruction of the main control unit 220. With the use of the wireless communication, transmission and reception of various kinds of file data, such as voice data and image data, and electronic mail data, or reception of Web data, streaming data, or the like are performed.

The display input unit 204 is a so-called touch panel which displays images (still images and moving images) or character information, or the like to visually transfer information to the user and detects a user's operation on the displayed information under the control of the main control unit 220, and includes the display panel 202 and the operation panel 203.

The display panel 202 uses a liquid crystal display (LCD), an organic electro-luminescence display (OELD), or the like as a display device.

The operation panel 203 is a device which is placed such that an image displayed on a display surface of the display panel 202 is visible, and detects one or a plurality of coordinates of an operation with a user's finger or a stylus. If the device is operated with the user's finger or the stylus, a detection signal due to the operation is output to the main control unit 220. Next, the main control unit 220 detects an operation position (coordinates) on the display panel 202 based on the received detection signal.

As shown in FIG. 16, although the display panel 202 and the operation panel 203 of the smartphone 200 illustrated as an embodiment of an imaging device of the invention are integrated to constitute the display input unit 204, the operation panel 203 is arranged to completely cover the display panel 202.

In a case where this arrangement is employed, the operation panel 203 may have a function of detecting a user's operation even in a region outside the display panel 202. In other words, the operation panel 203 may include a detection region (hereinafter, referred to as a display region) for a superimposed portion overlapping the display panel 202 and a detection region (hereinafter, referred to as a non-display region) for an outer edge portion not overlapping the display panel 202 other than the display region.

Although the size of the display region may completely match the size of the display panel 202, it is not necessary to match both of the size of the display region and the size of the display panel. The operation panel 203 may include two sensitive regions including an outer edge portion and an inner portion other than the outer edge portion. The width of the outer edge portion is appropriately designed according to the size of the housing 201 or the like. As a position detection system which is employed in the operation panel 203, a matrix switching system, a resistive film system, a surface acoustic wave system, an infrared system, an electromagnetic induction system, an electrostatic capacitance system, and the like are exemplified, and any system can be employed.

The call handling unit 211 includes the speaker 205 and the microphone 206, converts voice of the user input through the microphone 206 to voice data processable in the main control unit 220 and outputs voice data to the main control unit 220, or decodes voice data received by the wireless communication unit 210 or the external input/output unit 213 and outputs voice from the speaker 205. As shown in FIG. 14, for example, the speaker 205 can be mounted on the same surface as the surface on which the display input unit 204 is provided, and the microphone 206 can be mounted on the side surface of the housing 201.

The operating unit 207 is a hardware key using a key switch or the like, and receives an instruction from the user. For example, as shown in FIG. 15, the operating unit 207 is a push button-type switch which is mounted on the side surface of the housing 201 of the smartphone 200, and is turned on by being pressed with a finger or the like and is turned off by restoration force of the panel or the like if the finger is released.

The storage unit 212 stores a control program or control data of the main control unit 220, application software, address data in association with the name, telephone number, and the like of a communication partner, data of transmitted and received electronic mail, Web data downloaded by Web browsing, and downloaded content data, and temporarily stores streaming data or the like. The storage unit 212 is constituted of an internal storage unit 217 embedded in the smartphone and an external storage unit 218 having a slot for a detachable external memory. The internal storage unit 217 and the external storage unit 218 constituting the storage unit 212 are realized using a memory (for example, a microSD (Registered Trademark) memory or the like), such as a flash memory type, a hard disk type, a multimedia card micro type, or a card type, or a storage medium, such as a random access memory (RAM) or a read only memory (ROM).

The external input/output unit 213 plays a role of an interface with all external devices connected to the smartphone 200, and is provided for direct or indirect connection to other external devices through communication or the like (for example, universal serial bus (USB), IEEE 1394, or the like), or a network (for example, the Internet, wireless LAN, Bluetooth (Registered trademark), radio frequency identification (RFID), infrared communication (infrared data association: IrDA (Registered Trademark), ultra wideband (UWB) (Registered Trademark), ZigBee (Registered Trademark), or the like).

The external devices connected to the smartphone 200 are, for example, a wired or wireless headset, a wired or wireless external charger, a wired or wireless data port, a memory card connected through a card socket, a subscriber identity module (SIM) card, a user identity module (UIM) card, an external audio-video device connected through an audio-video input/output (I/O) terminal, an external audio-video device connected in a wireless manner, a smartphone connected in a wired or wireless manner, a personal computer connected in a wired or wireless manner, an earphone connected in a wired or wireless manner and the like. The external input/output unit 213 can transfer data transmitted from the external devices to the respective components in the smartphone 200 or can transmit data in the smartphone 200 to the external devices.

The GPS receiving unit 214 receives GPS signals transmitted from GPS satellites ST1 to STn according to an instruction of the main control unit 220, executes positioning calculation processing based on a plurality of received GPS signals, and detects the position of the smartphone 200 having latitude, longitude, and altitude. In a case where positional information can be acquired from the wireless communication unit 210 or the external input/output unit 213 (for example, a wireless LAN), the GPS receiving unit 214 can detect the position using the positional information.

The motion sensor unit 215 includes, for example, a three-axis acceleration sensor or the like, and detects physical motion of the smartphone 200 according to an instruction of the main control unit 220. The moving direction or acceleration of the smartphone 200 is detected by detecting physical motion of the smartphone 200. The detection result is output to the main control unit 220.

The power supply unit 216 supplies electric power stored in a battery (not shown) to the respective units of the smartphone 200 according to an instruction of the main control unit 220.

The main control unit 220 includes a microprocessor, operates according to the control program or control data stored in the storage unit 212, and integrally controls the respective units of the smartphone 200. The main control unit 220 has a mobile communication control function of controlling respective units of a communication system in order to perform voice communication or data communication through the wireless communication unit 210, and an application processing function.

The application processing function is realized by the main control unit 220 operating according to application software stored in the storage unit 212. The application processing function is, for example, an infrared communication function of controlling the external input/output unit 213 to perform data communication with a device facing the smartphone 200, an electronic mail function of transmitting and receiving electronic mail, a Web browsing function of browsing Web pages, or the like.

The main control unit 220 has an image processing function of displaying video on the display input unit 204, or the like based on image data (still image or moving image data), such as received data or downloaded streaming data. The image processing function refers to a function of the main control unit 220 decoding image data, performing image processing on the decoding result, and displaying an image on the display input unit 204.

The main control unit 220 executes display control on the display panel 202 and operation detection control for detecting a user's operation through the operating unit 207 and the operation panel 203. With the execution of the display control, the main control unit 220 displays an icon for activating application software or a software key, such as a scroll bar, or displays a window for creating electronic mail. The scroll bar refers to a software key for receiving an instruction to move a display portion of an image which is too large to fit into the display region of the display panel 202.

With the execution of the operation detection control, the main control unit 220 detects a user's operation through the operating unit 207, receives an operation on the icon or an input of a character string in an entry column of the window through the operation panel 203, or receives a scroll request of a display image through the scroll bar.

In addition, with the execution of the operation detection control, the main control unit 220 has a touch panel control function of determining whether an operation position on the operation panel 203 is the superimposed portion (display region) overlapping the display panel 202 or the outer edge portion (non-display region) not overlapping the display panel 202 other than the display region, and controlling the sensitive region of the operation panel 203 or the display position of the software key.

The main control unit 220 may detect a gesture operation on the operation panel 203 and may execute a function set in advance according to the detected gesture operation. The gesture operation is not a conventional simple touch operation, but means an operation to render a track with a finger or the like, an operation to simultaneously designate a plurality of positions, or an operation to render a track for at least one of a plurality of positions by combining the above-described operations.

The camera unit 208 includes the configuration other than the external memory control unit 20, the recording medium 21, the display control unit 22, the display unit 23, and the operating unit 14 in the digital camera shown in FIG. 1. Captured image data generated by the camera unit 208 can be recorded in the storage unit 212 or can be output through the external input/output unit 213 or the wireless communication unit 210. In the smartphone 200 shown in FIG. 15, although the camera unit 208 is mounted on the same surface as the display input unit 204, the mounting position of the camera unit 208 is not limited thereto, and the camera unit may be mounted on the rear surface of the display input unit 204.

The camera unit 208 can be used for various functions of the smartphone 200. For example, an image acquired by the camera unit 208 can be displayed on the display panel 202, or an image in the camera unit 208 can be used as one operation input of the operation panel 203. In a case where the GPS receiving unit 214 detects the position, the position may be detected with reference to an image from the camera unit 208. In addition, the optical axis direction of the camera unit 208 of the smartphone 200 can be determined or a current use environment may be determined with reference to an image from the camera unit 208 without using the three-axis acceleration sensor or in combination with the three-axis acceleration sensor. Of course, an image from the camera unit 208 may be used in application software.

In addition, image data of a still image or a moving image may be attached with positional information acquired by the GPS receiving unit 214, voice information (which may be converted to text information through voice-text conversion by the main control unit or the like) acquired by the microphone 206, posture information acquired by the motion sensor unit 215, or the like and can be recorded in the storage unit 212, or may be output through the external input/output unit 213 or the wireless communication unit 210.

Even in the smartphone 200 configured as above, it is possible to perform high-speed and high-accuracy AF.

As described above, the following matters are disclosed in this specification.

Disclosed is a focusing control device comprising an evaluation value calculation unit that causes an imaging element which images a subject through a focus lens to image the subject for each of positions of the focus lens while moving the focus lens movable in an optical axis direction, and calculates evaluation values for determining a focusing position of the focus lens based on signals acquired by performing any filtering process selected among a plurality of filtering processes in which passbands are different on captured image signals acquired through the imaging, a focusing position determination unit that selects a plurality of evaluation values among the evaluation values calculated by the evaluation value calculation unit, calculates a maximum point of an evaluation value curve indicating a relationship between the evaluation values and the positions of the focus lens based on the plurality of selected evaluation values, and determines the position of the focus lens corresponding to the maximum point, as the focusing position, and a focusing control unit that performs focusing control for moving the focus lens to the focusing position. The focusing position determination unit increases the number of evaluation values to be selected as a lower frequency limit of the passband becomes lower, as the filtering process selected by the evaluation value calculation unit.

Disclosed is a focusing control device comprising an evaluation value calculation unit that causes an imaging element which images a subject through a focus lens to image the subject for each of positions of the focus lens while moving the focus lens movable in an optical axis direction, and calculates evaluation values for determining a focusing position of the focus lens based on captured image signals acquired through the imaging, a focusing position determination unit that selects a plurality of evaluation values among the evaluation values calculated by the evaluation value calculation unit, calculates a maximum point of an evaluation value curve indicating a relationship between the evaluation values and the positions of the focus lens based on the plurality of selected evaluation values, and determines the position of the focus lens corresponding to the maximum point, as the focusing position, a focusing control unit that performs focusing control for moving the focus lens to the focusing position, and a sharpness determination unit that determines sharpness of a curve indicating a relationship between the evaluation values and a predetermined movement range of the focus lens based on the evaluation values corresponding to the movement range including the position of the focus lens at which a maximum evaluation value among the evaluation values calculated by the evaluation value calculation unit is acquired. The focusing position determination unit increases the number of evaluation values to be selected as the sharpness determined by the sharpness determination unit becomes lower.

In the disclosed focusing control device, the focusing position determination unit adjusts the number of evaluation values used in the calculation of the maximum point based on a shape of a data curve indicating a relationship between all the selected evaluation values and the positions of the focus lens corresponding to the evaluation values.

In the disclosed focusing control device, the focusing position determination unit selects a first evaluation value as a maximum value, second evaluation values acquired in positions from a reference position to an n-th position in which n is a natural number of 2 or greater on one side in a movement direction of the focus lens by using the reference position as the position of the focus lens in which the first evaluation value is acquired, and third evaluation values acquired in positions from the reference position to an n-th position on the other side of the reference position in the movement direction of the focus lens, among the evaluation values calculated by the evaluation value calculation unit. The focusing position determination unit determines symmetry between curve portions constituted by two evaluation values acquired in positions separated from the reference position by two or more positions on the one side and the other side among the selected evaluation values and evaluation values acquired in adjacent positions closer to the reference position than the separated positions among the selected evaluation values, and excludes the two evaluation values and evaluation values acquired in positions farther from the reference position than the positions of the focus lens in which the two evaluation values among the selected evaluation values are acquired from the evaluation values used in the calculation of the maximum point in a case where the symmetry is lower than a symmetry threshold value.

In the disclosed focusing control device, the focusing position determination unit calculates a temporary evaluation value curve based on the first evaluation value and the second evaluation values, calculates a difference between the evaluation value of the two evaluation values which corresponds to the position on the other side in the movement direction and a temporary evaluation value of the temporary evaluation value curve which corresponds to the position, and determines that the symmetry is lower than the symmetry threshold value in a case where the difference exceeds a threshold value.

In the disclosed focusing control device, the focusing position determination unit selects a first evaluation value as a maximum value, second evaluation values acquired in positions from a reference position to an n-th position in which n is a natural number of 2 or greater on one side in a movement direction of the focus lens by using the reference position as the position of the focus lens in which the first evaluation value is acquired, and third evaluation values acquired in positions from the reference position to an m-th position in which m is a natural number of 1 or greater on the other side of the reference position in the movement direction of the focus lens, among the evaluation values calculated by the evaluation value calculation unit. The focusing position determination unit determines steepness of curve portions constituted by evaluation values acquired in arbitrary positions separated from the reference position by two or more positions on the one side and the other side among the selected evaluation values and evaluation values acquired in adjacent positions closer to the reference position than the arbitrary positions among the selected evaluation values, and excludes the evaluation values acquired in the arbitrary positions and evaluation values acquired in positions farther from the reference position than the arbitrary positions among the selected evaluation values from the evaluation values used in the calculation of the maximum point in a case where the steepness is lower than a steepness threshold value.

In the disclosed focusing control device, the focusing position determination unit determines that the steepness is lower than the steepness threshold value in a case where a first change ratio of a first adjacent evaluation value acquired in an adjacent position, closer to the reference position than the arbitrary position, to the arbitrary position among the selected evaluation values to the evaluation value acquired in the arbitrary position is lower than a second change ratio of an evaluation value acquired at a position adjacent, closer to the reference position than the arbitrary position, to the adjacent position (a position next next the arbitrary position, closer to the reference position than the arbitrary position) among the selected evaluation values to the first adjacent evaluation value.

In the disclosed focusing control device, the focusing position determination unit determines reliability of the focusing position determined by the evaluation values based on the evaluation values used in the calculation of the maximum point, and determines the focusing position by calculating the maximum point in a case where the determined reliability is equal to or higher than a reliability threshold value.

Disclosed is an imaging device comprising the focusing control device, and an imaging element that images a subject through a focus lens moved to a focusing position by the focusing control unit.

Disclosed is a focusing control method comprising an evaluation value calculation step of causing an imaging element which images a subject through a focus lens to image the subject for each of positions of the focus lens while moving the focus lens movable in an optical axis direction, and calculating evaluation values for determining a focusing position of the focus lens based on captured image signals acquired through the imaging, a focusing position determination step of selecting a plurality of evaluation values among the evaluation values calculated in the evaluation value calculation step, calculating a maximum point of an evaluation value curve indicating a relationship between the evaluation values and the positions of the focus lens based on the plurality of selected evaluation values, and determining the position of the focus lens corresponding to the maximum point, as the focusing position, and a focusing control step of performing focusing control for moving the focus lens to the focusing position. In the evaluation value calculation step, the evaluation values are calculated based on signals acquired by performing any filtering process selected among a plurality of filtering processes in which passbands are different on the captured image signals, and in the focusing position determination step, the number of evaluation values to be selected increases as a lower frequency limit of the passband becomes lower, as the filtering process selected in the evaluation value calculation step.

Disclosed is a focusing control method comprising an evaluation value calculation step of causing an imaging element which images a subject through a focus lens to image the subject for each of positions of the focus lens while moving the focus lens movable in an optical axis direction, and calculating evaluation values for determining a focusing position of the focus lens based on captured image signals acquired through the imaging, a focusing position determination step of selecting a plurality of evaluation values among the evaluation values calculated in the evaluation value calculation step, calculating a maximum point of an evaluation value curve indicating a relationship between the evaluation values and the positions of the focus lens based on the plurality of selected evaluation values, and determining the position of the focus lens corresponding to the maximum point, as the focusing position, a focusing control step of performing focusing control for moving the focus lens to the focusing position, and a sharpness determination step of determining sharpness of a curve indicating a relationship between the evaluation values and a predetermined movement range of the focus lens based on the evaluation values corresponding to the movement range including the position of the focus lens in which the maximum evaluation value among the evaluation values calculated in the evaluation value calculation step is acquired. In the focusing position determination step, the number of evaluation values to be selected increases as the sharpness determined in the sharpness determination step becomes lower.

In the disclosed focusing control method, in the focusing position determination step, the number of evaluation values used in the calculation of the maximum point is adjusted based on a shape of a data curve indicating a relationship between all the selected evaluation values and the positions of the focus lens corresponding to the evaluation values.

In the disclosed focusing control method, in the focusing position determination step, a first evaluation value as a maximum value, second evaluation values acquired in positions from a reference position to an n-th position in which n is a natural number of 2 or greater on one side in a movement direction of the focus lens by using the reference position as the position of the focus lens in which the first evaluation value is acquired, and third evaluation values acquired in positions from the reference position to an n-th position on the other side of the reference position in the movement direction of the focus lens are selected among the evaluation values calculated in the evaluation value calculation step. Symmetry between curve portions constituted by two evaluation values acquired in positions separated from the reference position by two or more positions on the one side and the other side among the selected evaluation values and evaluation values acquired in adjacent positions closer to the reference position than the separated positions among the selected evaluation values is determined, and the two evaluation values and evaluation values acquired in positions farther from the reference position than the positions of the focus lens in which the two evaluation values among the selected evaluation values are acquired are excluded from the evaluation values used in the calculation of the maximum point in a case where the symmetry is lower than a symmetry threshold value.

In the disclosed focusing control method, in the focusing position determination step, a temporary evaluation value curve is calculated based on the first evaluation value and the second evaluation values, a difference between the evaluation value of the two evaluation values which corresponds to the position on the other side in the movement direction and a temporary evaluation value of the temporary evaluation value curve which corresponds to the position is calculated, and it is determined that the symmetry is lower than the symmetry threshold value in a case where the difference exceeds a threshold value.

In the disclosed focusing control method, in the focusing position determination step, a first evaluation value as a maximum value, second evaluation values acquired in positions from a reference position to an n-th position in which n is a natural number of 2 or greater on one side in a movement direction of the focus lens by using the reference position as the position of the focus lens in which the first evaluation value is acquired, and third evaluation values acquired in positions from the reference position to an m-th position in which m is a natural number of 1 or greater on the other side of the reference position in the movement direction of the focus lens are selected among the evaluation values calculated in the evaluation value calculation step. Steepness of curve portions constituted by evaluation values acquired in arbitrary positions separated from the reference position by two or more positions on the one side and the other side among the selected evaluation values and evaluation values acquired in adjacent positions closer to the reference position than the arbitrary positions among the selected evaluation values is determined, and the evaluation values acquired in the arbitrary positions and evaluation values acquired in positions farther from the reference position than the arbitrary positions among the selected evaluation values are excluded from the evaluation values used in the calculation of the maximum point in a case where the steepness is lower than a steepness threshold value.

In the disclosed focusing control method, in the focusing position determination step, it is determined that the steepness is lower than the steepness threshold value in a case where a first change ratio of a first adjacent evaluation value acquired at an adjacent position, closer to the reference position than the arbitrary position, to the arbitrary position among the selected evaluation values to the evaluation value acquired in the arbitrary position is lower than a second change ratio of an evaluation value acquired at a position adjacent, closer to the reference position than the arbitrary position, to the adjacent position (a position next next the arbitrary position, closer to the reference position than the arbitrary position) among the selected evaluation values to the first adjacent evaluation value.

In the disclosed focusing control method, in the focusing position determination step, reliability of the focusing position determined by the evaluation values is determined based on the evaluation values used in the calculation of the maximum point, and the focusing position is determined by calculating the maximum point in a case where the determined reliability is equal to or higher than a reliability threshold value.

Disclosed is a focusing control program causing a computer to perform an evaluation value calculation step of causing an imaging element which images a subject through a focus lens to image the subject for each of positions of the focus lens while moving the focus lens movable in an optical axis direction, and calculating evaluation values for determining a focusing position of the focus lens based on captured image signals acquired through the imaging, a focusing position determination step of selecting a plurality of evaluation values among the evaluation values calculated in the evaluation value calculation step, calculating a maximum point of an evaluation value curve indicating a relationship between the evaluation values and the positions of the focus lens based on the plurality of selected evaluation values, and determining the position of the focus lens corresponding to the maximum point, as the focusing position, and a focusing control step of performing focusing control for moving the focus lens to the focusing position. In the evaluation value calculation step, the evaluation values are calculated based on signals acquired by performing any filtering process selected among a plurality of filtering processes in which passbands are different on the captured image signals, and in the focusing position determination step, the number of evaluation values to be selected increases as a lower frequency limit of the passband becomes lower, as the filtering process selected in the evaluation value calculation step.

Disclosed is a focusing control program causing a computer to perform an evaluation value calculation step of causing an imaging element which images a subject through a focus lens to image the subject for each of positions of the focus lens while moving the focus lens movable in an optical axis direction, and calculating evaluation values for determining a focusing position of the focus lens based on captured image signals acquired through the imaging, a focusing position determination step of selecting a plurality of evaluation values among the evaluation values calculated in the evaluation value calculation step, calculating a maximum point of an evaluation value curve indicating a relationship between the evaluation values and the positions of the focus lens based on the plurality of selected evaluation values, and determining the position of the focus lens corresponding to the maximum point, as the focusing position, a focusing control step of performing focusing control for moving the focus lens to the focusing position, and a sharpness determination step of determining sharpness of a curve indicating a relationship between the evaluation values and a predetermined movement range of the focus lens based on the evaluation values corresponding to the movement range including the position of the focus lens in which the maximum evaluation value among the evaluation values calculated in the evaluation value calculation step is acquired. In the focusing position determination step, the number of evaluation values to be selected increases as the sharpness determined in the sharpness determination step becomes lower.

The invention is applied to, in particular, a digital camera or the like, thereby achieving high convenience and effectiveness.

Although the invention has been described above by a specific embodiment, the invention is not limited to the embodiment, and various modifications may be made without departing from the technical spirit of the invention disclosed herein.

This application is based on Japanese Patent Application No. 2015-194232, filed Sep. 30, 2015, the content of which is incorporated herein.

EXPLANATION OF REFERENCES

1: imaging lens (including focus lens)
2: stop
5: imaging element
6: analog signal processing unit
7: analog-to-digital conversion circuit
8: lens drive unit
9: stop drive unit
10: imaging element drive unit
11: system control unit
14: operating unit
15: memory control unit
16: main memory
17: digital signal processing unit
18: compression/decompression processing unit
20: external memory control unit
21: recording medium
22: display control unit
23: display unit
24: control bus
25: data bus
191: evaluation value calculation unit
192: focusing position determination unit
193: focusing control unit
194: sharpness determination unit
200: smartphone
201: housing
202: display panel
203: operation panel
204: display input unit
205: speaker
206: microphone
207: operating unit
208: camera unit
210: wireless communication unit
211: call handling unit
212: storage unit
213: external input/output unit
214: GPS receiving unit
215: motion sensor unit
216: power supply unit
217: internal storage unit
218: external storage unit
220: main control unit
ST1 to STn: GPS satellite
X1, X2, X6: evaluation value curve
X3, X4: determination evaluation value curve
X5, X7: data curve

What is claimed is:

1. A focusing control device comprising:
an evaluation value calculation unit that causes an imaging element which images a subject through a focus lens to image the subject for each of positions of the focus lens while moving the focus lens movable in an optical axis direction, and calculates evaluation values for determining a focusing position of the focus lens based on signals acquired by performing any filtering process selected among a plurality of filtering processes in which passbands are different on captured image signals acquired through the imaging;
a focusing position determination unit that selects a plurality of evaluation values among the evaluation values calculated by the evaluation value calculation unit, calculates a maximum point of an evaluation value curve indicating a relationship between the evaluation values and the positions of the focus lens based on the plurality of selected evaluation values, and determines a position of the focus lens corresponding to the maximum point, as the focusing position; and
a focusing control unit that performs focusing control to move the focus lens to the focusing position,
wherein the focusing position determination unit makes, in the selecting of the plurality of evaluation values among the evaluation values calculated by the evaluation value calculation unit, number of the selected evaluation values in a case where a lower frequency limit of a passband of the filtering process selected by the evaluation value calculation unit is equal to or lower than a frequency threshold value to be greater than number of the selected evaluation values in a case where a lower frequency limit of a passband of the filtering process selected by the evaluation value calculation unit is higher than the frequency threshold value.

2. The focusing control device according to claim 1, wherein the focusing position determination unit adjusts the number of the selected evaluation values used in the calculation of the maximum point based on a shape of a data curve indicating a relationship between all the selected evaluation values and positions of the focus lens corresponding to the evaluation values.

3. The focusing control device according to claim 2, wherein the focusing position determination unit selects a first evaluation value as a maximum value, second evaluation values acquired at positions from a reference position to an n-th position in which n is a natural number of 2 or greater on one side in a movement direction of the focus lens by using the reference position as a position of the focus lens at which the first evaluation value is acquired, and third evaluation values acquired at positions from the reference position to an n-th position on other side of the reference position in the movement direction of the focus lens, among the evaluation values calculated by the evaluation value calculation unit, and
determines symmetry between curve portions constituted by two evaluation values acquired at positions separated from the reference position by two or more positions on the one side and the other side among the selected evaluation values and evaluation values acquired at adjacent positions, closer to the reference position than the separated positions, to the separated positions among the selected evaluation values, and excludes the two evaluation values and evaluation values acquired at positions farther from the reference position than the positions of the focus lens in which the two evaluation values among the selected evaluation values are acquired from the evaluation values used in the calculation of the maximum point in a case where the symmetry is lower than a symmetry threshold value.

4. The focusing control device according to claim 3, wherein the focusing position determination unit calculates a temporary evaluation value curve based on the first evaluation value and the second evaluation values, calculates a difference between the evaluation value of the two evaluation values which corresponds to the position on the other side in the movement direction and a temporary evaluation value of the temporary evaluation value curve which corresponds to the position, and determines that the symmetry is lower than the symmetry threshold value in a case where the difference exceeds a threshold value.

5. The focusing control device according to claim 2, wherein the focusing position determination unit selects a first evaluation value as a maximum value, second evaluation values acquired at positions from a reference position to an n-th position in n is a natural number of 2 or greater on one side in a movement direction of the focus lens by using the reference position as a position of the focus lens at which the first evaluation value is acquired, and third evaluation values acquired at positions from the reference position to an m-th position in which m is a natural number of 1 or greater on other side of the reference position in the movement direction of the focus lens, among the evaluation values calculated by the evaluation value calculation unit, and determines steepness of curve portions constituted by evaluation values acquired at arbitrary positions separated from the reference position by two or more positions on the one side and the other side among the selected evaluation values and evaluation values acquired at adjacent positions, closer to the reference position than the arbitrary positions, to the arbitrary positions among the selected evaluation values, and excludes the evaluation values acquired at the arbitrary positions and evaluation values acquired at positions farther from the reference position than the arbitrary positions among the selected evaluation values from the evaluation values used in the calculation of the maximum point in a case where the steepness is lower than a steepness threshold value.

6. The focusing control device according to claim 5, wherein the focusing position determination unit determines that the steepness is lower than the steepness threshold value in a case where a first change ratio of a first adjacent evaluation value acquired at an adjacent position, closer to the reference position than the arbitrary position, to the arbitrary position among the selected evaluation values to the evaluation value acquired at the arbitrary position is lower than a second change ratio of an evaluation value acquired at a position adjacent, closer to the reference position than the arbitrary position, to the adjacent position among the selected evaluation values to the first adjacent evaluation value.

7. The focusing control device according to claim 1, wherein the focusing position determination unit determines reliability of the focusing position determined by the evaluation values based on the evaluation values used in the calculation of the maximum point, and determines the focusing position by calculating the maximum point in a case where the determined reliability is equal to or higher than a reliability threshold value.

8. An imaging device comprising:
the focusing control device according claim 1; and
an imaging element that images a subject through a focus lens moved to a focusing position by the focusing control unit.

9. A focusing control method comprising:
an evaluation value calculation step of causing an imaging element which images a subject through a focus lens to image the subject for each of positions of the focus lens while moving the focus lens movable in an optical axis direction, and calculating evaluation values for determining a focusing position of the focus lens based on captured image signals acquired through the imaging;
a focusing position determination step of selecting a plurality of evaluation values among the evaluation values calculated in the evaluation value calculation step, calculating a maximum point of an evaluation value curve indicating a relationship between the evaluation values and the positions of the focus lens based on the plurality of selected evaluation values, and determining a position of the focus lens corresponding to the maximum point, as the focusing position; and
a focusing control step of performing focusing control to move the focus lens to the focusing position,
wherein, in the evaluation value calculation step, the evaluation values are calculated based on signals acquired by performing any filtering process selected among a plurality of filtering processes in which passbands are different on the captured image signals, and
the focusing position determination step makes, in the selecting of the plurality of evaluation values among the evaluation values calculated by the evaluation value calculation step, number of the selected evaluation values in a case where a lower frequency limit of a passband of the filtering process selected by the evaluation value calculation step is equal to or lower than a frequency threshold value to be greater than number of the selected evaluation values in a case where a lower frequency limit of a passband of the filtering process selected by the evaluation value calculation step is higher than the frequency threshold value.

10. The focusing control method according to claim 9, wherein, in the focusing position determination step, the number of the selected evaluation values used in the calculation of the maximum point is adjusted based on a shape of a data curve indicating a relationship between all the selected evaluation values and positions of the focus lens corresponding to the evaluation values.

11. The focusing control method according to claim 10, wherein, in the focusing position determination step, a first evaluation value as a maximum value, second evaluation values acquired at positions from a reference position to an n-th position in which n is a natural number of 2 or greater on one side in a movement direction of the focus lens by using the reference position as a position of the focus lens at which the first evaluation value is acquired, and third evaluation values acquired at positions from the reference position to an n-th position on other side of the reference position in the movement direction of the focus lens are selected among the evaluation values calculated in the evaluation value calculation step, and symmetry between curve portions constituted by two evaluation values acquired at positions separated from the reference position by two or more positions on the one side and the other side among the selected evaluation values and evaluation values acquired at adjacent positions, closer to the reference position than the separated positions, to the separated positions among the selected evaluation values is determined, and the two evaluation values and evaluation values acquired at positions farther from the reference position than the positions of the focus lens in which the two evaluation values among the selected evaluation values are acquired are excluded from the evaluation values used in the calculation of the maximum point in a case where the symmetry is lower than a symmetry threshold value.

12. The focusing control method according to claim 11, wherein, in the focusing position determination step, a temporary evaluation value curve is calculated based on the first evaluation value and the second evaluation values, a difference between the evaluation value of the two evaluation values which corresponds to the position on the other side in the movement direction and a temporary evaluation value of the temporary evaluation value curve which corresponds to the position is calculated, and it is determined that the symmetry is lower than the symmetry threshold value in a case where the difference exceeds a threshold value.

13. The focusing control method according to claim 10, wherein, in the focusing position determination step, a first evaluation value as a maximum value, second evaluation values acquired at positions from a reference position to an n-th position in which n is a natural number of 2 or greater on one side in a movement direction of the focus lens by using the reference position as a position of the focus lens at which the first evaluation value is acquired, and third evaluation values acquired at positions from the reference position to an m-th position in which m is a natural number of 1 or greater on other side of the reference position in the movement direction of the focus lens are selected among the evaluation values calculated in the evaluation value calculation step, and steepness of curve portions constituted by evaluation values acquired at arbitrary positions separated from the reference position by two or more positions on the one side and the other side among the selected evaluation values and evaluation values acquired at adjacent positions, closer to the reference position than the arbitrary positions, to the arbitrary positions among the selected evaluation values is determined, and the evaluation values acquired at the arbitrary positions and evaluation values acquired at positions farther from the reference position than the arbitrary positions among the selected evaluation values are excluded from the evaluation values used in the calculation of the maximum point in a case where the steepness is lower than a steepness threshold value.

14. The focusing control method according to claim 13, wherein, in the focusing position determination step, it is determined that the steepness is lower than the steepness threshold value in a case where a first change ratio of a first adjacent evaluation value acquired at an adjacent position, closer to the reference position than the arbitrary position, to the arbitrary position among the selected evaluation values to the evaluation value acquired at the arbitrary position is lower than a second change ratio of an evaluation value acquired at a position adjacent, closer to the reference position than the arbitrary position, to the adjacent position among the selected evaluation values to the first adjacent evaluation value.

15. The focusing control method according to claim 9, wherein, in the focusing position determination step, reliability of the focusing position determined by the evaluation values is determined based on the evaluation values used in the calculation of the maximum point, and the focusing position is determined by calculating the maximum point in a case where the determined reliability is equal to or higher than a reliability threshold value.

16. A non-transitory computer readable medium storing a focusing control program causing a computer to perform:

an evaluation value calculation step of causing an imaging element which images a subject through a focus lens to image the subject for each of positions of the focus lens while moving the focus lens movable in an optical axis direction, and calculating evaluation values for determining a focusing position of the focus lens based on captured image signals acquired through the imaging;

a focusing position determination step of selecting a plurality of evaluation values among the evaluation values calculated in the evaluation value calculation step, calculating a maximum point of an evaluation value curve indicating a relationship between the evaluation values and the positions of the focus lens based on the plurality of selected evaluation values, and determining a position of the focus lens corresponding to the maximum point, as the focusing position; and a focusing control step of performing focusing control to move the focus lens to the focusing position, wherein, in the evaluation value calculation step, the evaluation values are calculated based on signals acquired by performing any filtering process selected among a plurality of filtering processes in which passbands are different on the captured image signals, and the focusing position determination step makes, in the selecting of the plurality of evaluation values among the evaluation values calculated by the evaluation value calculation step, number of the selected evaluation values in a case where a lower frequency limit of a passband of the filtering process selected by the evaluation value calculation step is equal to or lower than a frequency threshold value to be greater than number of the selected evaluation values in a case where a lower frequency limit of a passband of the filtering process selected by the evaluation value calculation step is higher than the frequency threshold value.

* * * * *